(12) United States Patent
Ma

(10) Patent No.: US 10,509,093 B2
(45) Date of Patent: Dec. 17, 2019

(54) SYSTEM AND METHOD FOR FAST SYSTEM ACQUISITION AND CHANNEL ESTIMATION

(71) Applicant: Futurewei Technologies, Inc., Plano, TX (US)

(72) Inventor: Zhengxiang Ma, Summit, NJ (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 456 days.

(21) Appl. No.: 15/395,649

(22) Filed: Dec. 30, 2016

(65) Prior Publication Data
US 2018/0191065 A1    Jul. 5, 2018

(51) Int. Cl.
| | |
|---|---|
| G01S 3/46 | (2006.01) |
| G01S 3/14 | (2006.01) |
| H01Q 21/06 | (2006.01) |
| H01Q 3/36 | (2006.01) |
| H01Q 3/38 | (2006.01) |
| H04B 7/06 | (2006.01) |
| H04B 7/08 | (2006.01) |

(52) U.S. Cl.
CPC .................... G01S 3/46 (2013.01); G01S 3/14 (2013.01); H01Q 3/36 (2013.01); H01Q 3/38 (2013.01); H01Q 21/061 (2013.01); H04B 7/0695 (2013.01); H04B 7/088 (2013.01)

(58) Field of Classification Search
CPC .......... G01S 3/14; G01S 3/46; G01S 3/66–70; H04B 7/0695; H04B 7/088
See application file for complete search history.

(56) References Cited

U.S. PATENT DOCUMENTS

| | | | |
|---|---|---|---|
| 4,646,099 A | * | 2/1987 | Apostolos ................ G01S 3/14 342/196 |
| 2006/0104382 A1 | | 5/2006 | Yang et al. |
| 2016/0277094 A1 | | 9/2016 | Ying et al. |

FOREIGN PATENT DOCUMENTS

| | | |
|---|---|---|
| CN | 202494777 U | 10/2012 |
| WO | 2006102254 A1 | 9/2006 |
| WO | 2012063532 A1 | 5/2012 |
| WO | 2016180116 A1 | 11/2016 |

OTHER PUBLICATIONS

English Translation of WO 2012/063532 A1 (Year: 2019).*
"3rd Generation Partnership Project; Technical Specification Group Radio Access Network; Evolved Universal Terrestrial Radio Access (E-UTRA); LTE physical layer; General description (Release 13)," 3GPP TS 36.201, V13.2.0, Jun. 2016, 14 pages.

* cited by examiner

Primary Examiner — Bernarr E Gregory
Assistant Examiner — Fred H Mull
(74) Attorney, Agent, or Firm — Slater Matsil, LLP

(57) ABSTRACT

A method for operating a transmit-receive point (TRP) includes generating a different spatial domain to time domain transform (STT) symbol for each antenna element in an antenna array, and transmitting the STT symbols using the antenna array to sweep a beam along a first plane in the time domain.

26 Claims, 10 Drawing Sheets

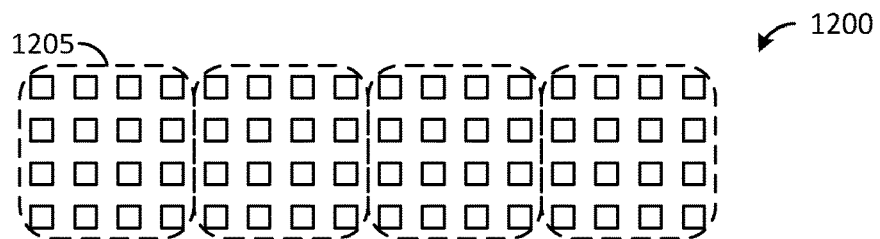
Fig. 12
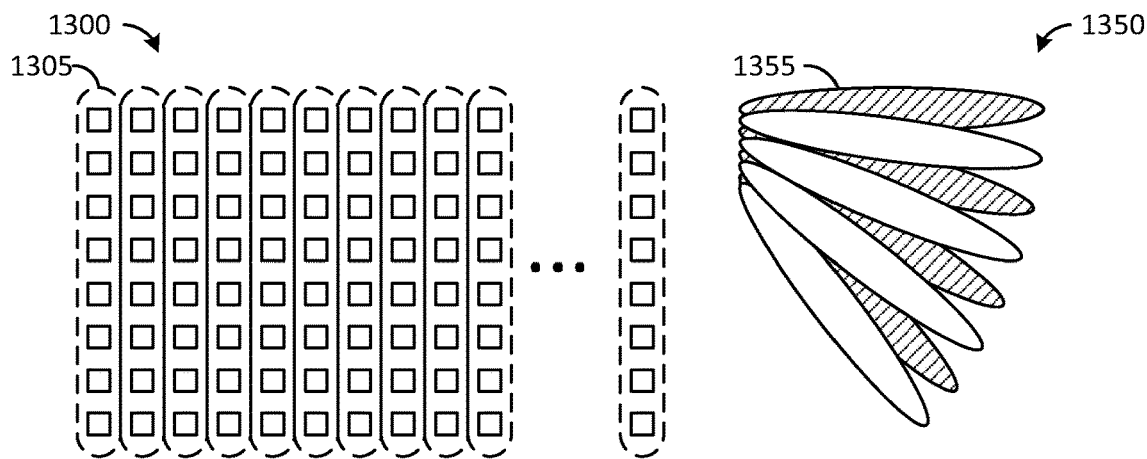
Fig. 13A
Fig. 13B
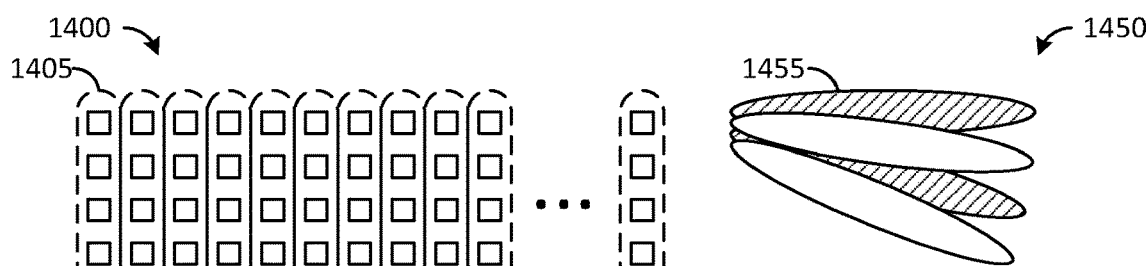
Fig. 14A
Fig. 14B
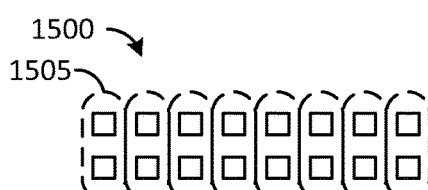
Fig. 15A
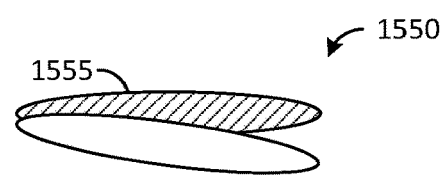
Fig. 15B

SYSTEM AND METHOD FOR FAST SYSTEM ACQUISITION AND CHANNEL ESTIMATION

TECHNICAL FIELD

The present invention relates generally to a system and method for digital communications, and, in particular embodiments, to a system and method for fast system acquisition and channel estimation.

BACKGROUND

Future wireless communications systems are operating at ever higher carrier frequencies in a quest to find greater bandwidth and less interference. These wireless communications systems may operate at frequencies of 6 GHz and above, which are referred to herein as millimeter wave (mmWave) frequencies. However, operating at the mmWave frequencies also present challenges, including: greater pathloss compared to lower frequency bands (on the order of 10-20 dB additional loss); fewer user multi-path with link fragility becoming a major problem for continuous coverage; and significant increase in digital signal processing due to the much greater available bandwidth (especially for user equipments (UEs)).

A variety of techniques have been proposed to combat the challenges, including: beamforming with large array gain (at both the terminal devices and access nodes) to overcome pathloss; simultaneous connectivity with multiple access nodes to overcome link fragility (implying a dense deployment that presents an opportunity for in-band backhauling among the access nodes while requiring an air interface that is flexible without undue complexity); and simplified signal processing for communicating devices, especially the terminal devices.

SUMMARY

Example embodiments provide a system and method for fast system acquisition and channel estimation.

In accordance with an example embodiment, a method for operating a transmit-receive point (TRP) is provided. The method includes generating, by the TRP, a different spatial domain to time domain transform (STT) symbol for each antenna element in an antenna array, and transmitting, by the TRP, the STT symbols using the antenna array to sweep a beam along a first plane in the time domain.

In accordance with an example embodiment, a method for operating a user equipment (UE) is provided. The method includes receiving, by the UE, signals associated with STI symbols transmitted by a TRP, identifying, by the UE, signal peaks in the received signals, determining, by the UE, an angle of departure for the UE relative to the TRP in accordance with the signal peaks, and transmitting, by the UE, angle of departure information to the TRP.

In accordance with an example embodiment, a TRP is provided. The TRP includes a processor, and a computer readable storage medium storing programming for execution by the processor as well as radio front end circuit blocks to provide filtering, amplification, frequency conversion and tuning and power amplification among other known radio frequency front end elements and processing. The programming including instructions to configure the TRP to generate a different STT symbol for each antenna element in an antenna array, and transmit the STT symbols using the antenna array to sweep a beam along a first plane in the time domain. The outgoing symbols are then processed by the radio front end for wireless transmission.

In accordance with an example embodiment, a UE is provided. The UE includes a processor, and a computer readable storage medium storing programming for execution by the processor. The UE, as with other TRPs, includes the radio frequency front end elements for transmitting and receiving radio frequency signals including the mmWave frequency signals. The programming including instructions to configure the UE to receive signals associated with STT symbols transmitted by a TRP, identify signal peaks in the received signals, determine an angle of departure for the UE relative to the TRP in accordance with the signal peaks, and transmit angle of departure information to the TRP.

Practice of the foregoing embodiments enables TRPs and UEs to participate in system acquisition and channel estimation without having to perform complex and protracted beam sweeping, which reduces overall communications system efficiency while increasing computational complexity.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 12 illustrates a two dimensional antenna array partitioned into P=4 sub-arrays according to example embodiments described herein;

FIG. 13A illustrates an antenna array with 128×8 antenna elements arranged into 128 columns of 8 antenna elements each according to example embodiments described herein;

FIG. 13B illustrates downtilt beams associated with the antenna array of FIG. 13A according to example embodiments described herein;

FIG. 14A illustrates an antenna array with 32×4 antenna elements arranged into 32 columns of 4 antenna elements each according to example embodiments described herein;

FIG. 14B illustrates downtilt beams associated with the antenna array of FIG. 14A according to example embodiments described herein;

FIG. 15A illustrates an antenna array with 8×2 antenna elements arranged into 8 columns of 2 antenna elements each according to example embodiments described herein;

FIG. 15B illustrates downtilt beams associated with the antenna array of FIG. 15A according to example embodiments described herein;

DETAILED DESCRIPTION OF ILLUSTRATIVE EMBODIMENTS

Figure 1A:
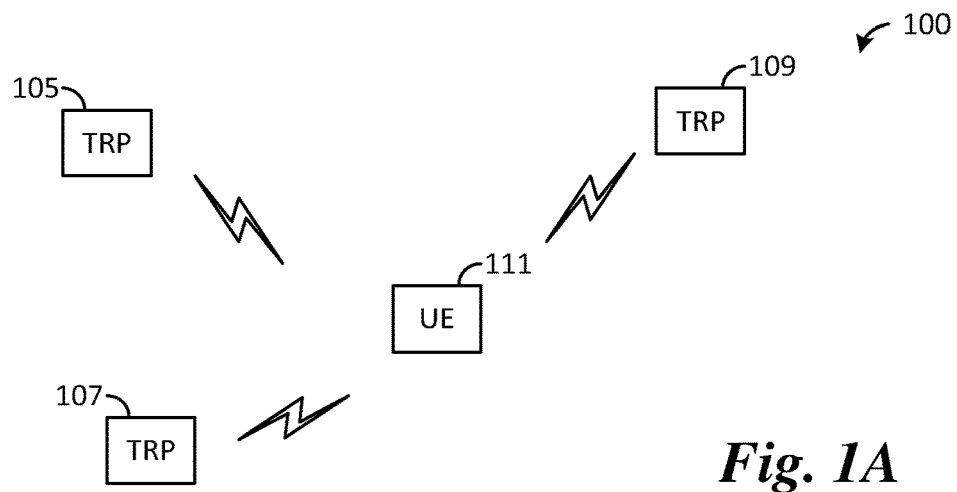
FIG. 1A illustrates an example wireless communications system according to example embodiments described herein.

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

As discussed previously, because beamforming is unavoidable at both the access nodes and the user equipments (UEs) in millimeter wave (mmWave) communications systems, it may be more intuitive to think of communications to occur in beam space. As an example, instead of thinking about the mmWave communications system in terms of multiple transmit antenna elements and multiple receive antenna elements, it is helpful to visualize the mmWave communications system in terms of narrow communications beams pointing in different directions at both the access nodes and the UEs. An advantage of using the beam space is a much smaller number of significant communications beams needed in communications versus the number of antenna elements (due to the sparseness of the channel at the mmWave frequencies), therefore, leading to a potential reduction in hardware logic and complexity. Another advantage involves a reduction in interference between neighboring communications devices due to the use of narrow communications beams with high pathloss.

Access nodes may also be commonly referred to as evolved NodeBs (eNBs), base stations, NodeBs, master eNBs (MeNBs), secondary eNBs (SeNBs), remote radio heads, access points, and the like, while UEs may also be commonly referred to as mobiles, mobile stations, terminals, subscribers, users, stations, and the like. A transmission point (TP) may be used to refer to any device capable of transmitting. Therefore, transmission points may refer to access nodes, eNBs, base stations, NodeBs, MeNBs, SeNBs, remote radio heads, access points, UEs, mobiles, mobile stations, terminals, subscribers, users, and the like. A transmit-receive point (TRP) refers to a network-side TP that also is capable of receiving.

Additional factors for consideration in the design of mmWave communications systems include:

Fast system acquisition and synchronization: Without the broadcast of broad communications beams, UEs may find it difficult to rapidly acquire operating parameters of the mmWave communications systems and achieve synchronization.

Channel estimation: Due to the large number of communications beam directions at both the TRPs and the UEs, it may be difficult to quickly measure all possible matches between transmit beams and receive beams and then select the best combination(s) for communications.

Broadcast information: Is it possible to implement information broadcasting using narrow communications beams? Is it possible to minimize the need to broadcast information.

Random access and paging: Techniques to initiate access to the TRP that is also using a narrow communications beam to receive and page a UE using narrow communications beams are needed.

FIG. 1A illustrates an example wireless communications system 100. Communications system includes a plurality of TRPs, such as TRP 105, TRP 107, and TRP 109. A subset of the plurality of TRPs is in communications with a UE 111. The subset of the plurality of TRPs may provide services to UE 111. UE 111 may also communicate with other devices by transmitting through the subset of TRPs. While it is understood that communications systems may employ multiple TRPs capable of communicating with a number of UEs, only three TRPs and one UE are illustrated for simplicity.

In general, time division duplexing (TDD) is the default mode for communications systems operating in high frequency bands. However, for mmWave communications systems, full duplex operation may be explored (at least at the TRPs) and has a good probability of success due to relatively low inter-cell interference arising from the high pathloss at mmWave frequencies and the use of narrow communications beams. Furthermore, due to the small size of the mmWave antenna array, transmit antennas and receive antennas can be physically separated in order to achieve good separation at the TRPs. Therefore, absolute timing synchronization is not required between the TRPs, which is a requirement for TDD communications systems. However, the availability of timing synchronization may potentially enhance the performance of the communications system.

Furthermore, the modulation, channel estimation, and access procedures may be simplified, as compared to current Third Generation Partnership Project (3GPP) Long Term Evolution (LTE) technical standards, which are designed to maximize spectral efficiency in the very limited available bandwidth with very complex channel characteristics. At mmWave frequencies, it is typically expected that the channel would be more dynamic, therefore, channel estimation and other procedures may need to occur at a faster time scale. Additionally, with much greater available bandwidth, the digital signal processing will scale with the bandwidth if simplifying techniques are not developed. Spectral efficiency may be traded off for simplicity in digital signal processing, especially for UEs.

Figure 1B:
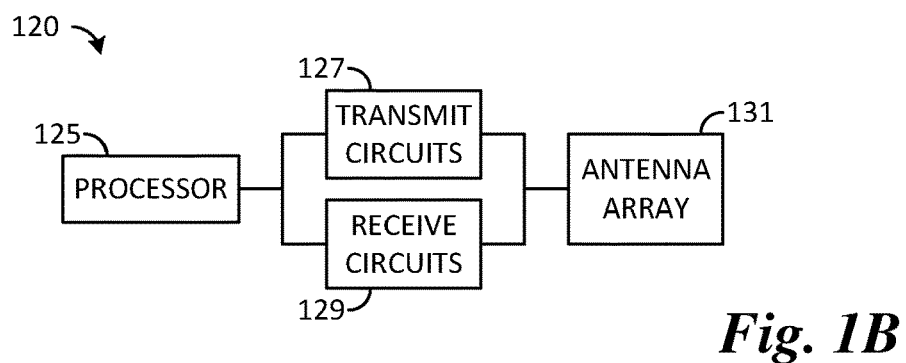
FIG. 1B illustrates a detailed view of a communications device according to example embodiments described herein.

FIG. 1B illustrates a detailed view of a communications device 120. Communications device 120 may be an example of a TRP or a UE. Communications device 120 includes a processor 125, transmit circuits 127, receive circuits 129, and an antenna array 131. Transmit circuits 127 include analog and digital circuitry used to generate signals for transmission using antenna array 131 from data provided by processor 125. Receive circuits 127 includes analog and digital circuitry used to generate data from signals received by antenna array 131. Processor 125 is configured to digitally process data to be transmitted and/or data received.

In current generation communications systems utilizing beamforming, part of the system acquisition process involves a TRP performing beam sweeping by transmitting reference signals on available transmit beams and UEs cycling through available receive beams to receive the transmitted reference signals and acquiring system information, such as communications beam information, an angle of departure of the transmit beam, and so forth. The beam sweeping can consume a considerable amount of network resources, especially in communications systems that require frequent system acquisition due to link blockages or link fragility. As an illustrative example, consider a communications system where TRPs have 16 available transmit beams and UEs have four available receive beams. In such a communications system, the system acquisition process may involve the TRP sequentially transmitting reference signals on each of the 16 transmit beams, with the dwell time of each TRP transmission being greater than the amount of time required for the UE to receive sufficient information using each of the four receive beams to acquire the system information.

Figure 2A:
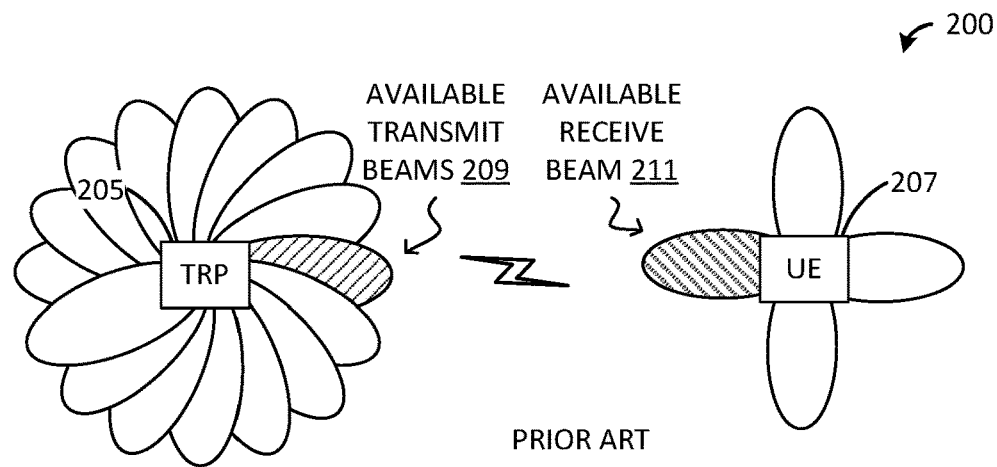
FIG. 2A illustrates an example communications system highlighting an example system acquisition process between a TRP and a UE.

FIG. 2A illustrates a communications system 200 highlighting an example system acquisition process between a TRP 205 and a UE 207. TRP 205 is shown transmitting reference signals using an available transmit beam 209 and UE 207 is shown receiving the reference signals using an available receive beam 211. Clearly, both transmit beam 209 and receive beam 211 have to be properly oriented in order for UE 207 to receive the transmission from TRP 205.

Figure 2B:
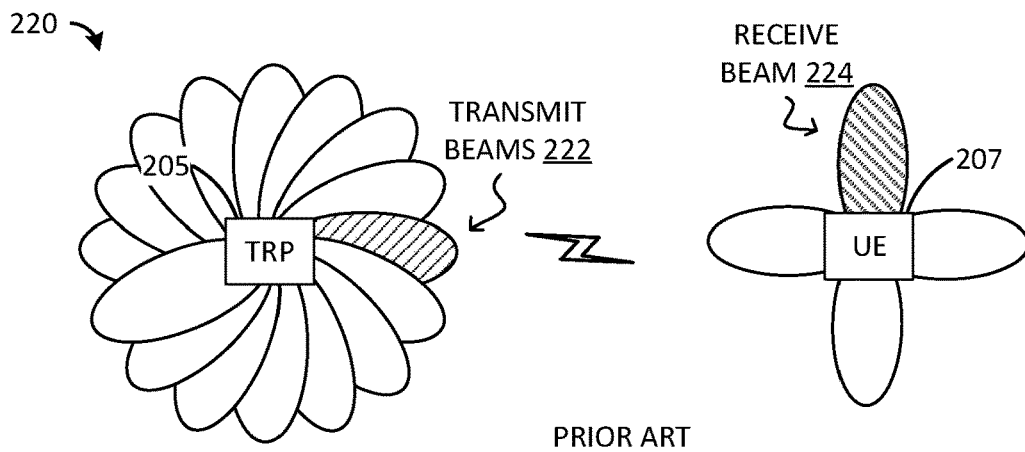
FIG. 2B illustrates a communications system highlighting a first example situation where TRP and UE are not properly oriented.

FIG. 2B illustrates a communications system 220 highlighting a first example situation where TRP 205 and UE 207 are not properly oriented. A transmit beam 222 of TRP 205 is properly oriented towards UE 207, but a receive beam 224 of UE 207 is not properly oriented towards TRP 205. Hence, UE 207 is not able to receive the transmission of the reference signals from TRP 205.

Figure 2C:
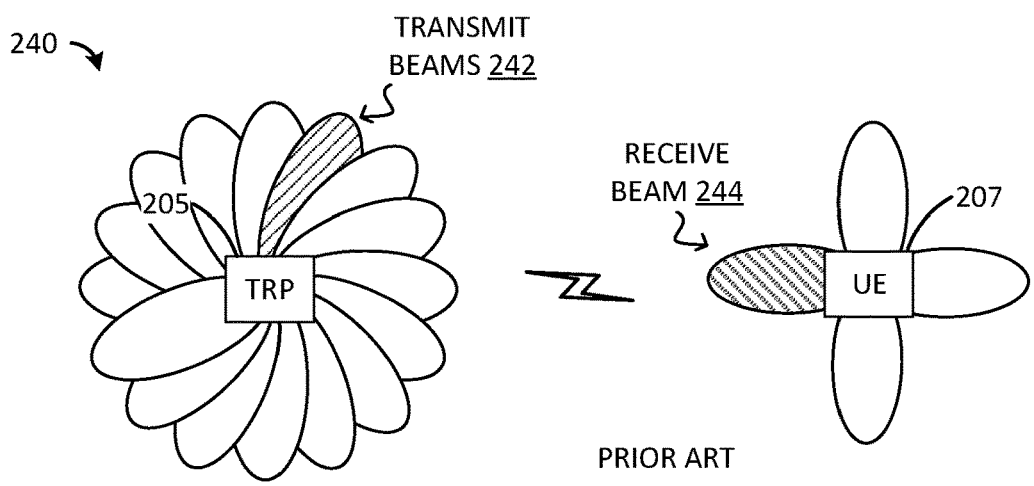
FIG. 2C illustrates a communications system highlighting a second example situation where TRP and UE are not properly oriented.

FIG. 2C illustrates a communications system 240 highlighting a second example situation where TRP 205 and UE 207 are not properly oriented. A transmit beam 242 of TRP 205 is not properly oriented towards UE 207, therefore even with a receive beam 244 of UE 207 being properly oriented towards TRP 205, UE 207 is not able to receive the transmission of the reference signals from TRP 205.

According to an example embodiment, it is possible to reduce the amount of time associated with the fast acquisition process by performing the transmission of the reference signals in the time domain rather than the spatial domain. Instead of sequentially transmitting reference signals on subsets of available transmit beams, it is possible for each individual antenna element of an antenna array to simultaneously transmit signals at different frequencies to perform beam sweeping in the time domain and permit the UE to determine system information, such as the angle of departure of the UE relative to the TRP. The signals at different frequencies transmitted by the individual antenna elements are referred to herein as spatial domain to time domain transformation (STT) symbols. As an illustrative example, each antenna element of a linear antenna array simultaneously transmits a STT symbol that is a sine wave with a different frequency for a period of time $T_0$ (e.g., an orthogonal frequency division multiplexed (OFDM) symbol duration). In general, the ST symbol $x_k$ transmitted by antenna element k is expressible as $$x_k(t) = e^{-i(\omega_0 + k \cdot \Delta\omega)\left(t - \frac{T_0}{2}\right)} \quad \Delta\omega \cdot T_0 = 2\pi,$$

where $\omega_0$ is the carrier frequency, $\Delta\omega$ is the sub-carrier spacing, K is the number of antenna elements in the antenna array, $T_0$ is the duration of the STT symbol, and $K\Delta\omega$ is the total used bandwidth.

Although the discussion of the example embodiments presented herein focuses on determining the angle of departure for the UE relative to the antenna array, the example embodiments presented herein are also operable with other directional information, including direction of departure, angle of arrival, direction of arrival, and so on. Therefore, the discussion of angle of departure should not be construed as being limiting to either the scope or spirit of the example embodiments.

Figure 3A:
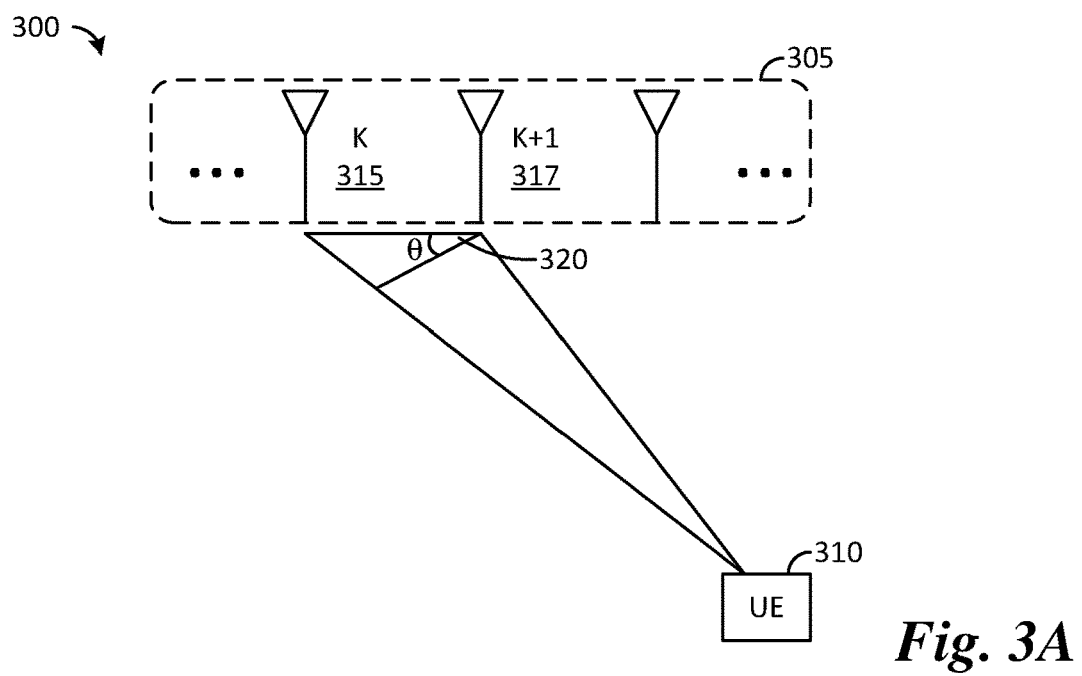
FIG. 3A illustrates an example communications system highlighting a linear antenna array transmitting STT symbols to a UE according to example embodiments described herein.

FIG. 3A illustrates an example communications system 300 highlighting a linear antenna array 305 transmitting STT symbols to a UE 310. Linear antenna array 305 includes M antenna elements, such as k-th antenna element 315 and (k+1)-th antenna element 317. There is a spacing d between antenna elements of linear antenna array 305. As shown in FIG. 3, UE 310 is located at an angle θ 320 relative to linear antenna array 305.

UE 310, located a distance away from linear antenna array 305 at angle θ 320, receives a signal y(θ) expressible as $$y(\theta, t) = Ae^{-i(\omega_0 t + \Phi_0)} \sum_{k=0}^{K-1} e^{-ik\left(\Delta\omega\left(t-\frac{T_0}{2}\right)-\frac{2\pi}{\lambda}d\sin(\theta)\right)},$$

where $\Phi_0$ is a constant phase offset due to the propagation over the air, A is the received signal amplitude from each transmitting antenna element, and $\lambda$ is the wavelength of the carrier frequency. It is noted that the $$\frac{T_0}{2}$$

shift the equations for $x_k(t)$ and $y(\theta,t)$ centers the signal peak in the middle of the STT symbol period.

Figure 3B:
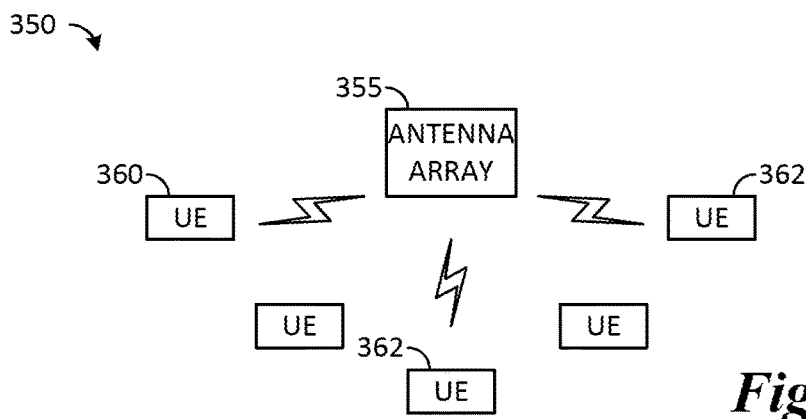
FIG. 3B illustrates a communications system highlighting different angles of departure relative to an antenna array according to example embodiments described herein.

FIG. 3B illustrates a communications system 350 highlighting different angles of departure relative to an antenna array 355. As shown in FIG. 3B, UE 360 may be located at a first angle of departure, e.g., −60 degrees, relative to antenna array 355. While UE 352 may be located at a second angle of departure, e.g., 0 degrees, and UE 354 may be located at a third angle of departure, e.g., +60 degrees, all relative to antenna array 355. It is noted that the angle of departures shown in FIG. 3B are all in a single plane, e.g., an azimuth plane. In some deployments, a second plane, e.g., an elevation plane, is also present. In an alternative, the single plane may be the elevation plane and the second plane may be the azimuth plane.

Figure 4A:
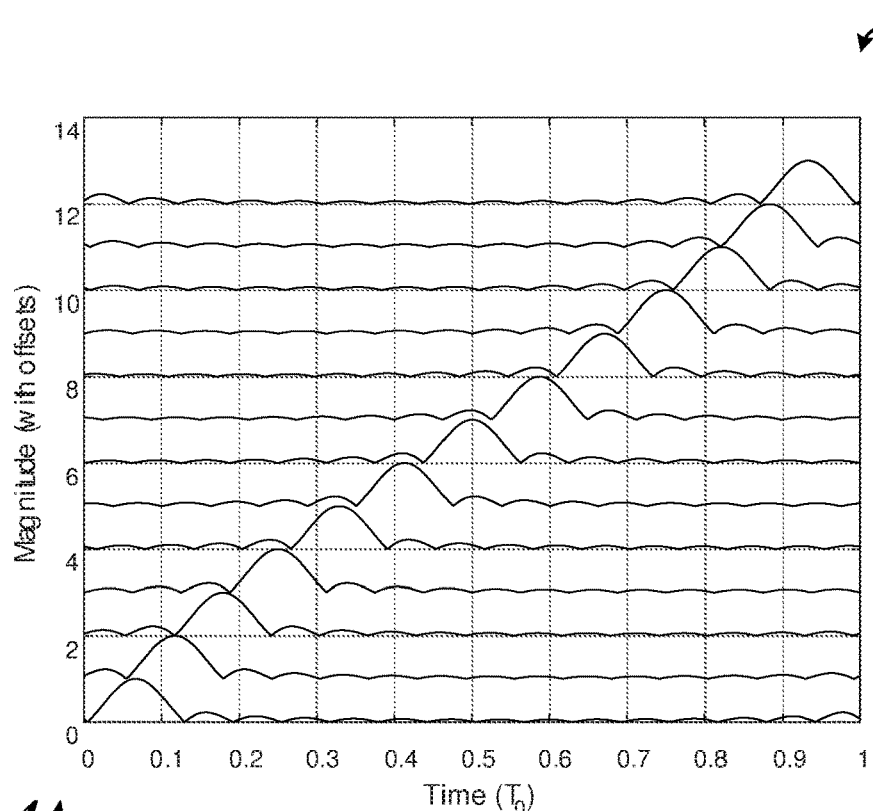
FIG. 4A illustrates a graph of signal $y(\theta,t)$ received by a UE at different values of angle $\theta$ relative to a linear antenna array transmitting STT symbols according to example embodiments described herein.

FIG. 4A illustrates a graph 400 of signal $y(\theta,t)$ received by a UE at different values of angle $\theta$ relative to a linear antenna array transmitting STT symbols. The STT symbols are transmitted for time $T_o$. The x-axis of graph 400 displays fractions of time $T_o$ and the y-axis of graph 400 displays the magnitude of signal $y(\theta,t)$ with offsets for different values of angle $\theta$. The linear antenna array comprises 16 antenna elements spaced $d=\lambda/2$ apart. The UE is located at different azimuth angles ranging from −60 degrees to +60 degrees in 10 degree increments. As an example, trace 405 represents signal $y(\theta,t)$ received by the UE located at −60 degrees relative to the linear antenna array, while trace 410 represents signal $y(\theta,t)$ received by the UE located at −50 degrees relative to the linear antenna array, and so forth.

As shown in FIG. 4A, each trace includes a signal peak and the signal peaks for each trace occurs at a different time. As an illustrative example, trace 405 has a signal peak 407 occurring at approximately $0.07*T_o$ and trace 410 has a signal peak 412 occurring at approximately $0.12*T_o$. It is noted that the signal peaks occur at different times, depending upon the value of angle $\theta$ relative to the linear antenna array.

Figure 4B:
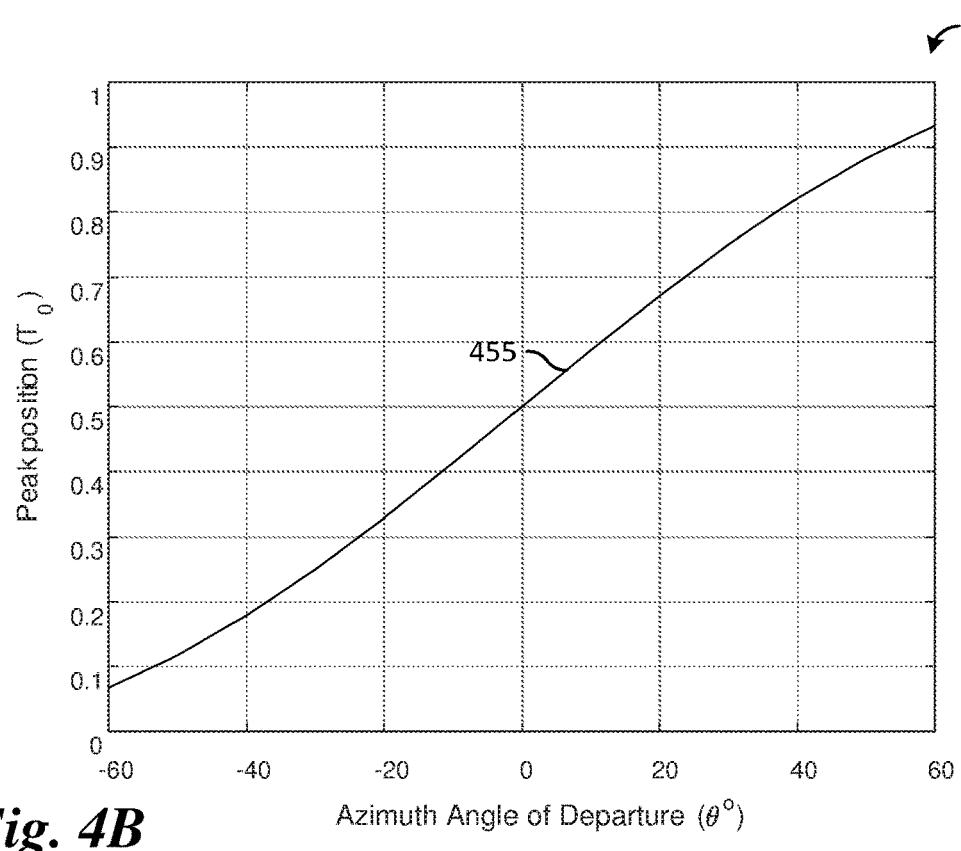
FIG. 4B illustrates a graph displaying a relationship between angle $\theta$ and signal peak position according to example embodiments described herein.

FIG. 4B illustrates a graph 450 displaying a relationship between angle $\theta$ and signal peak position. Trace 455 represents the relationship between angle $\theta$ (the angle of departure for a UE relative to an antenna array) and signal peak position as a fraction of time $T_o$, i.e., time of arrival. Trace 455 is monotonic, therefore, it is possible to uniquely determine the angle of departure from the time of arrival of the signal peak present in signal $y(\theta,t)$ that is received by the UE. The transmission of the STT symbols has effectively transformed the spatial information (the angles of departure) into time of arrival of the signal peak.

According to an example embodiment, a system and method for fast system acquisition is provided wherein different STI symbols are transmitted by antenna elements of an antenna array of a TRP. The transmission of the different STI symbols by the antenna elements of the antenna array allows for the elimination of the TRP having to perform beam sweeping in the spatial domain, which involves the TRP transmitting reference signals on different transmit beams. Thereby, reducing communications overhead and the time spent in system acquisition.

According to an example embodiment, the TRPs periodically transmit the STI symbols at maximum transmit power level. The transmission of the STT symbols at the maximum transmit power level enables maximum available coverage. The UEs detect the signal peaks, as well as arrival times and phases of the signal peaks, which are used to determine system information, including angles of departures for a line of sight (LOS) path as well as any multipath that is present. The determination of the system information is generally fast and computationally efficient for the UEs due to the elimination of beam sweeping in the spatial domain, which is generally a sequential process. The UEs may provide feedback to the TRPs based on the system information, and the feedback may enable the TRPs to form transmit beams pointing to the UEs. The STI symbols may also be used to synchronize the frequency and timing of the UEs to the timing of the TRP. Additionally, while searching for the signal peaks, the UE can tune its own beamforming to maximize the signal peaks and match its own transmit beams with a particular mutlipath from particular TRPs. The UEs may then use the best transmit beams to initiate access to one or more desired TRPs (e.g., the TRP(s) with the strongest signals).

According to an example embodiment, a system and method for determining the time of arrival using STI symbols with a first frequency in a first half of the STI symbol and a second frequency in a second half of the STT symbol is provided. Although it is possible to determine the absolute arrival time of a signal peak from a STT symbols with a single frequency for the entirety of the duration of the STT symbol (such as shown in FIG. 4A) when used in conjunction with extra timing information provided by systems such as satellite positioning systems (e.g., the Global Positioning System (GPS)) and other types of signals at the UE, a technique that does not rely on extra timing information may be preferred.

An example technique for determining the time of arrival using different frequencies in different portions of the STT symbols includes the TRP transmitting a first frequency in a first half of the STT symbols where the frequency of the first half of the STT symbol transmitted by each antenna element ascends (as described previously $$\left(x_k(t) = e^{-i(\omega_0 + k\cdot\Delta\omega)\left(t-\frac{T_0}{2}\right)} \Delta\omega \cdot T_0 = 2\pi \text{ for } t = 0 \sim T_0\right),$$

and the frequency of the second half of the STT symbol transmitted by each antenna element descends and is expressible as $$\left(x_k(t) = e^{-i(\omega_0 + (K-k-1)\Delta\omega)\left(t-\frac{T_0}{2}\right)} \Delta\omega \cdot T_0 = 2\pi \text{ for } t = T_0 \sim 2T_0.\right.$$

As a result of the transmission of the STT symbols with frequencies in different portions, the UE will detect two signal peaks. The separation in time between the two signal peaks yields the time of arrival information that is related to the angle of departure. Although the discussion focuses on two different frequencies in the two halves of a STT symbol, the example embodiments are operable with two different frequencies in two consecutive STT symbols, or if a plurality of STT symbols are transmitted then a first subset of the plurality includes STT symbols with a first frequency and a second subset of the plurality includes STT symbols with a second frequency.

Figure 5A:
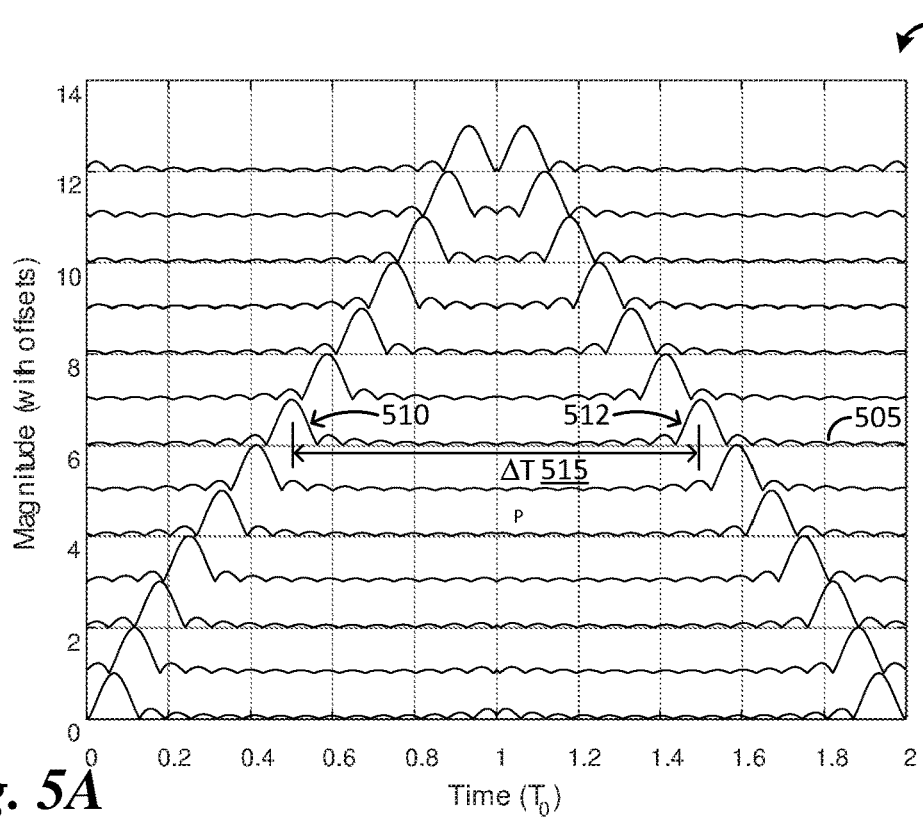
FIG. 5A illustrates a graph of signal $y(\theta,t)$ received by a UE at different values of angle $\theta$ relative to a linear antenna array transmitting STT symbols with different frequencies in different portions of each STT symbol according to example embodiments described herein.
Figure 5B:
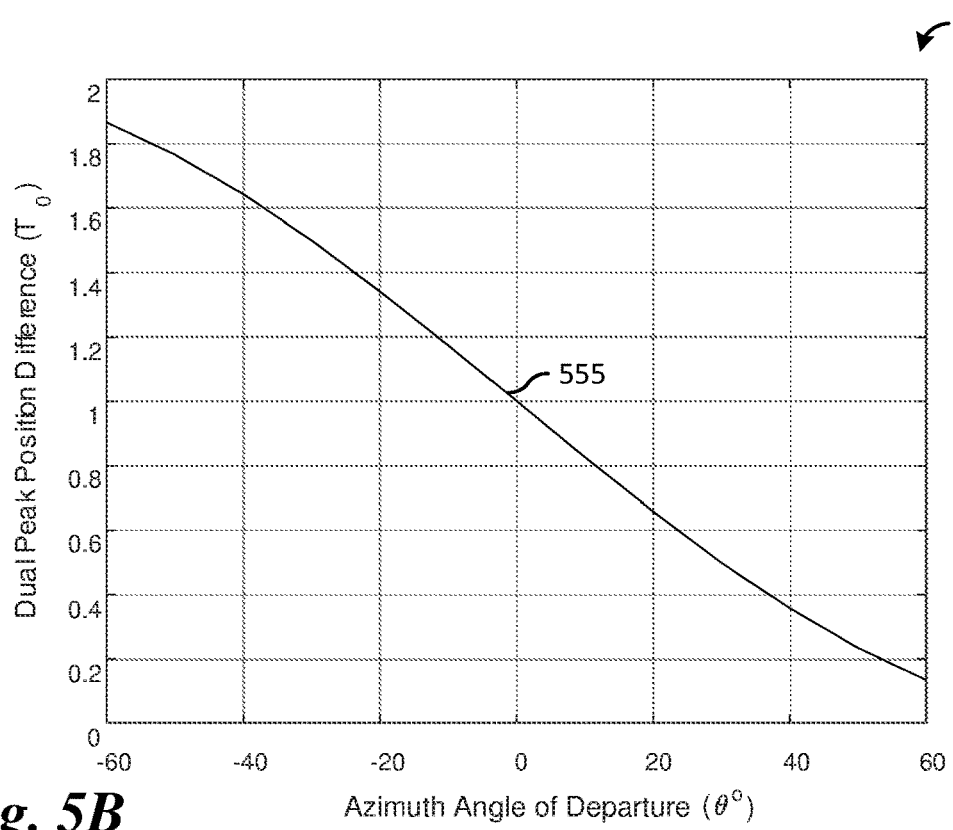
FIG. 5B illustrates a graph displaying a relationship between angle $\theta$ and a time difference $\Delta T_P$ according to example embodiments described herein.

FIG. 5A illustrates a graph 500 of signal y(θ,t) received by a UE at different values of angle θ relative to a linear antenna array transmitting STT symbols with different frequencies in different portions of each STT symbol. Each trace shown in graph 500 represents signal y(θ,t) received by the UE for a different angle θ. As an example, trace 505 represents signal y(θ,t) received by the UE for angle 0. Trace 505 features two signal peaks 510 and 512 that are a time difference $\Delta T_P$ 515 apart, with signal peak 510 corresponding to a first portion of the STT symbol with a first frequency and signal peak 512 corresponding to a second portion of the STT symbol with a second frequency. FIG. 5B illustrates a graph 550 displaying a relationship between angle θ and a time difference $\Delta T_P$. Trace 555 represents the relationship between angle θ and the time difference $\Delta T$ as a fraction of $T_o$. Trace 555 is monotonic, therefore, it is possible to uniquely determine the angle of departure from the time difference $\Delta T_P$ between the two signal peaks in signal y(θ,t) received by the UE. As an example, the time difference $\Delta T_P$ for the two signal peaks in trace 505 of FIG. 5A is approximately $1.0*T_o$, which, according to graph 550 of FIG. 5B corresponds to angle 0.

Multipath occurs when signals reflect from objects present in the environment arrive at the UE. The paths associated with the multipath are longer than the LOS paths and therefore, there is a delay associated with the multipath. The amount of delay associated with a particular multipath is dependent upon the length of the path associated with the multipath.

Figure 6A:
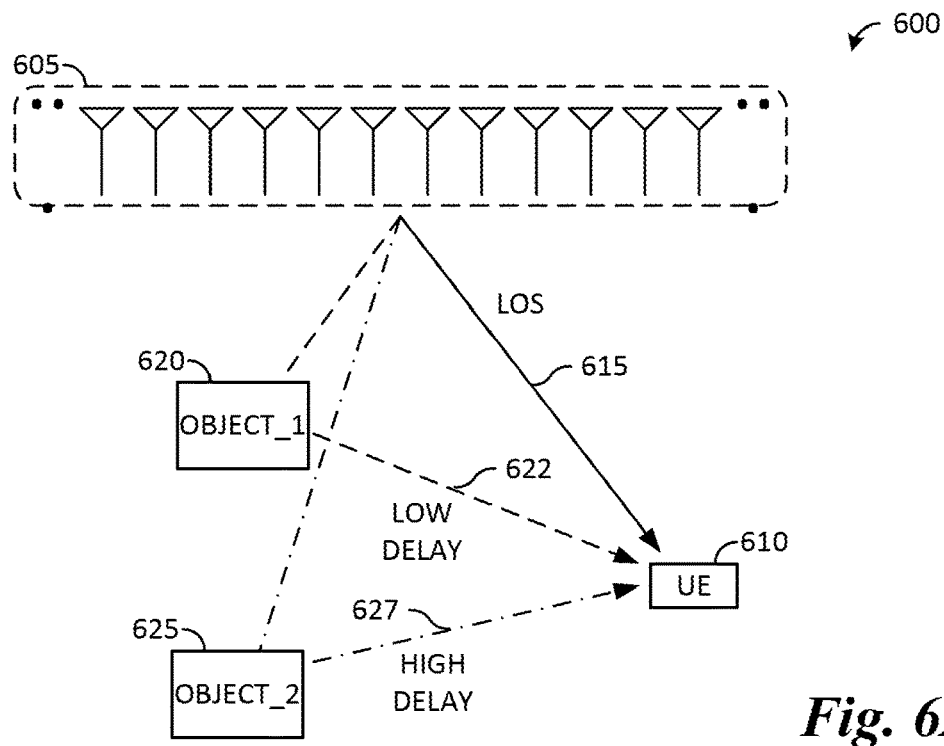
FIG. 6A illustrates a communications system highlighting the effects of multipath according to example embodiments described herein.

FIG. 6A illustrates a communications system 600 highlighting the effects of multipath. Communications system 600 includes a TRP with an antenna array 605. The TRP is transmitting STT symbols to a UE 610. A LOS path 615 exists between antenna array 605 and UE 610. However, there are objects in the environment of communications system 600 and some of the objects (e.g., object_1 620 and object_2 625) cause reflections that reach UE 610. Object_1 620 is closer to antenna array 605 and results in a shorter multipath with low delay 622, while object_2 625 is further away from antenna array 605 and results in a longer multipath with high delay 627.

The delay associated with the multipath and the angle of departure of the object(s) have an impact on when the UE receives the signal peak(s) of the signal after the signal reflects off the object(s). As an illustrative example, object_1 620 is more to the right (from the perspective of antenna array 605) of UE 610 than object_2 625, therefore, a first signal peak corresponding to the angle of departure of object_1 620 will be received prior to a second signal peak corresponding to the angle of departure of object_2 625. The lower delay associated with low delay multipath 622 will also result in UE 610 receiving the first signal peak even earlier than receiving the second signal pulse.

Figure 6B:
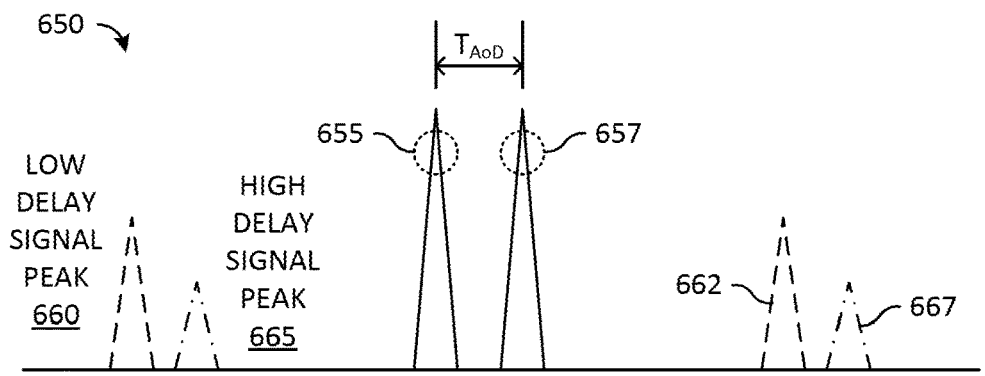
FIG. 6B illustrates a diagram of signal peaks received by a UE operating in an environment with multipath according to example embodiments described herein.

FIG. 6B illustrates a diagram 650 of signal peaks received by a UE operating in an environment with multipath. A first signal peak 655 and a second signal peak 657 correspond to a LOS path between an antenna array and the UE when the antenna array is transmitting STT symbols with different frequencies in different portions of each STT symbol as discussed previously. A third signal peak 660 and a fourth signal peak 662 correspond to a low delay multipath between the antenna array and the UE, while a fifth signal peak 665 and a sixth signal peak 667 correspond to a high delay multipath. It is noted that the magnitude of the signal peaks corresponding to the LOS path are higher than the magnitudes of the signal peaks corresponding to the multipaths. Additionally, the greater the distance the signal has to propagate, the lower the magnitude of the signal peaks.

As an illustrative example, signal peaks 655 and 657 correspond to the LOS path between antenna array 605 and UE 610. Furthermore, signal peaks 660 and 662 correspond to low delay multipath 622 and signal peaks 665 and 667 correspond to high delay multipath 627. From the pairs of signal peaks, UE 610 is able to determine channel characteristics, such as an angle of departure, a time delay, as well as a magnitude and phase, thereby obtaining a channel estimate of the channels (including the multipath channels), in accordance with the location and separation of the pairs of signal peaks.

In order to support access and mobility, the UE may need to distinguish and identify different TRPs. As an illustrative example, in a situation where there are multiple TRPs capable of serving the UE, the UE has to differentiate the multiple TRPs. The STT symbols transmitted by the TRPs may be used to allow the UE to differentiate between different TRPs.

According to an example embodiment, information is embedded into the STT symbols to convey identifying information for different TRPs.

According to an example embodiment, a time difference between a pair of STT symbols is used to convey identifying information for different TRPs. In other words, different TRPs use different time differences between pairs of STT symbols. The STT symbols in a pair of STT symbols may be identical or they may be different. Pairs of STT symbols may be periodically transmitted, with a periodicity of a frame period $T_F$, for example. Each TRP has an identifier offset $T_{CID}$ corresponding to a TRP identifier, such as a TRP identity, a cell identity, and so on, that is used to separate the two STT symbols in time.

In situations wherein there are multiple TRPs multiple signal peaks may be mistaken as multipath. In such a situation, it may be possible to use a neighbor offset $T_{NO}$ between neighboring TRPs. The various neighbor offsets between neighboring TRPs may be specified by an operator of the communications system.

Figure 7:
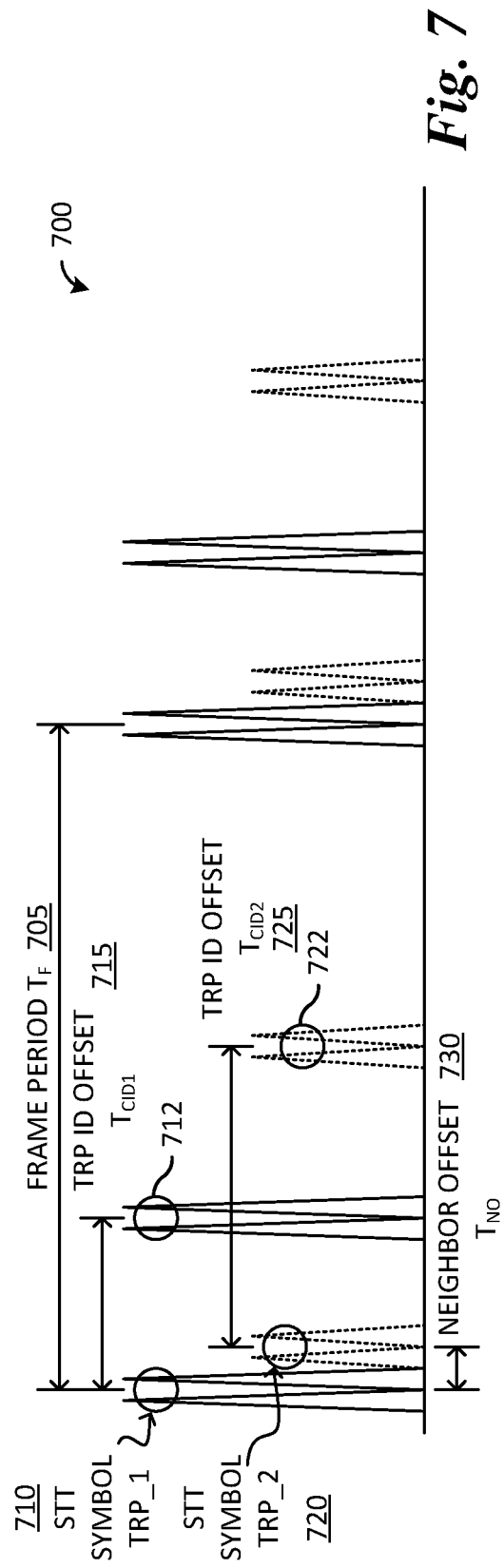
FIG. 7 illustrates a diagram of signal peaks received by a UE, where a time difference between a pair of STT symbols is used to convey identifying information for a TRP according to example embodiments described herein.

FIG. 7 illustrates a diagram 700 of signal peaks received by a UE, where a time difference between a pair of STT symbols is used to convey identifying information for a TRP. Diagram 700 displays signal peaks corresponding to two pairs of STT symbols transmitted by two TRPs with periodicity $T_F$ 705. A first pair of signal peaks 710 corresponds to a first pair of STT symbols transmitted by a first TRP and a second pair of signal peaks 712 corresponds to a second pair of STT symbols transmitted by the second TRP. A time offset 715 between first pair of signal peaks 710 and second pair of signal peaks 712 conveys a TRP identifier of the first TRP. A third pair of signal peaks 720 corresponds to a first pair of STT symbols transmitted by a second TRP and a fourth pair of signal peaks 722 corresponds to a second pair of STT symbols transmitted by the second TRP. A time offset 725 between third pair of signal peaks 720 and fourth pair of signal peaks 722 conveys a TRP identifier of the second TRP. A neighbor offset 730 between first pair of signal peaks 710 and third pair of signal peaks 720 help to prevent mistaking the various pairs of signal peaks for multipath.

According to an example embodiment, modulated STT symbols are used to convey identifying information for different TRPs. The STT symbols themselves may be modulated to encode information. In order to maintain the strength of the signal, phase modulation (e.g., binary phase shift keying (BPSK), quadrature phase shift keying (QPSK), 8PSK (eight value PSK), and so on, may be used. The modulation may be applied to the entire STT symbol or half of the STT symbol, allowing for a doubling of the amount of information that can be encoded. Furthermore, multiple STT symbols may be used to allow for the encoding of more information, which may include frame number, TRP identifier, access information, and so on. Additionally, frequency synchronization may be achieved by obtaining a good PSK constellation for the modulated STT symbol at the receiver.

Figure 8:
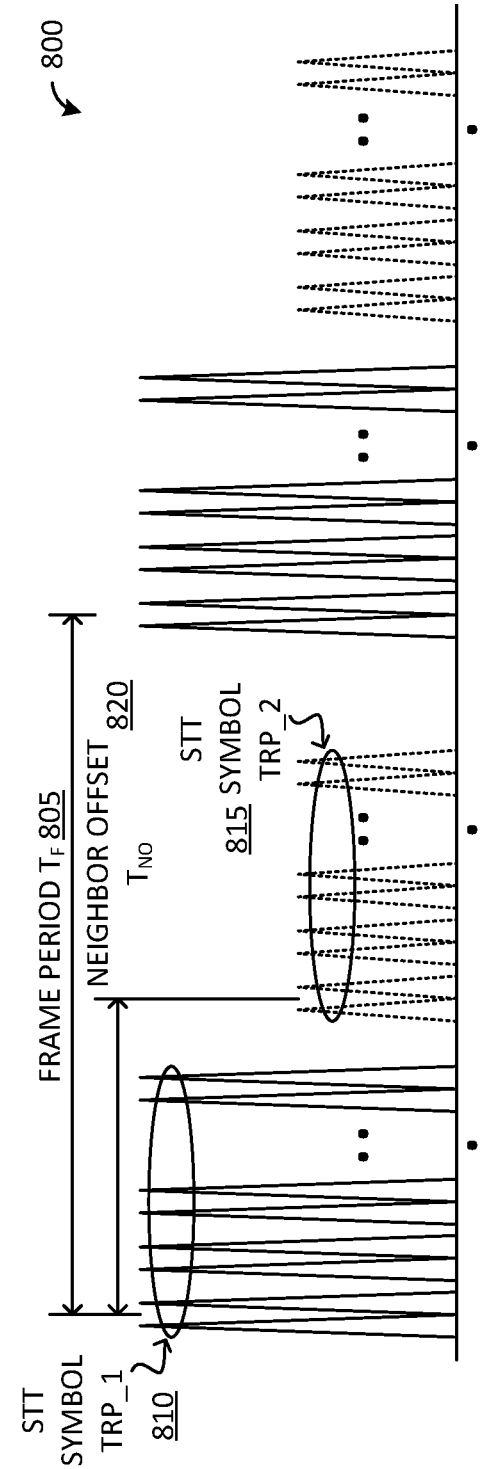
FIG. 8 illustrates a diagram of signal peaks received by a UE, where modulated STT symbols are used to convey information for TRPs according to example embodiments described herein.

FIG. 8 illustrates a diagram 800 of signal peaks received by a UE, where modulated STT symbols are used to convey information for TRPs. Diagram 800 displays signal peaks corresponding to modulated STT symbols transmitted by two TRPs with periodicity $T_F$ 805. A first set of signal peaks 810 correspond to a modulated STT symbol transmitted by a first TRP and a second set of signal peaks 815 correspond to a modulated STT symbol transmitted by a second TRP. A neighbor offset 820 between first set of signal peaks 810 and second set of signal peaks 815 help to prevent mistaking the various sets of signal peaks for multipath.

The example embodiments presented herein are also operable with two dimensional antenna arrays. Although the discussion presented above focus on linear antenna arrays, the example embodiments also apply to two dimensional antenna arrays. In a typical application, horizontal and vertical dimensions are not identical in terms of the width of coverage in angle and user distribution. For example, in most applications, horizontal coverage angle range needs to be wider (a greater azimuth range than elevation range).

According to an example embodiment, in a deployment with a two dimensional antenna array of dimension M×N, a plurality of angles in a first plane are defined and STT symbols are transmitted in each of the angles of the first plane, spanning a second plane, in the manner similar to description of deployments with a linear antenna array. In an example embodiment involving a deployment with the first plane being the elevation plane and the second plane being the azimuth plane, L (where L is less than or equal to N) downtilt angles are defined in the elevation plane by a set of L weighting vectors V and the STT symbols are transmitted by the antenna elements of the two dimensional antenna array for each downtilt angle. The weighting vectors V may span a desired elevation range. As an illustrative example, the weighting vectors are expressible as $$V_{kl} = e^{ik \cdot \Delta \phi_l} \quad \Delta \phi_l = \frac{2\pi d_v \sin \varphi_l}{\lambda},$$

where k is the antenna element index in the vertical dimension, l is the index of the downtilt angles, $d_v$ is the antenna element spacing in the vertical dimension, $\varphi_l$ is the downtilt angle, and λ is the wavelength of the carrier frequency. The TRP applies a weighting vector corresponding to the downtilt angle to antenna elements in the vertical dimension when transmitting STT symbols in the downtilt angle. A deployment where the first plane is the azimuth plane and the second plane is the elevation plane (e.g., a communications system providing communications in a high-rise building) is also possible.

A UE would receive STT symbols transmitted in the L downtilt angles and examine the received STT symbols to find the signal peaks with the greatest magnitude to determine a best downtilt angle and an angle of departure for the UE within the best downtilt angle.

Figure 9:
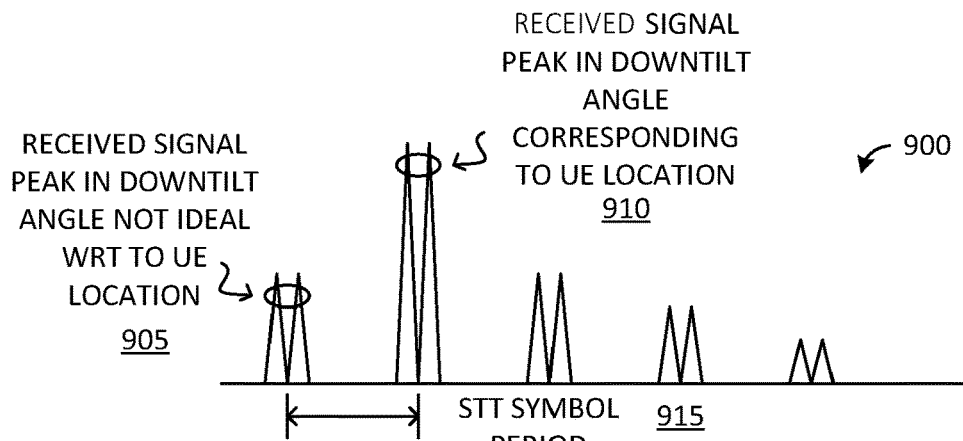
FIG. 9 illustrates a diagram of signal peaks received by a UE in a deployment with TRPs utilizing a two dimensional antenna array according to example embodiments described herein.

FIG. 9 illustrates a diagram 900 of signal peaks received by a UE in a deployment with TRPs utilizing a two dimensional antenna array. Diagram 900 displays a plurality of sets of signal peaks, such as a first set of signal peaks 905 and a second set of signal peaks 910, representing STT symbols received by the UE. Each set of signal peaks correspond to a different downtilt angle. The magnitudes of the sets of signal peaks are related to how well the downtilt angle matches up with the location of the UE. As an example, the magnitude of first set of signal peaks 905 is lower than the magnitude of second set of signal peaks 910, thereby indicating that the downtilt associated with second set of signal peaks 910 is better oriented towards the UE than the downtilt associated with first set of signal peaks 905. Alternatively, the path in the downtilt associated with first set of signal peaks 905 may have greater pathloss than the path in the downtilt associated with second set of signal peaks 910.

According to an example embodiment, in a deployment with a two dimensional antenna array of dimension M×N, scanning in the first plane and the second plane are combined to help reduce the time involved in the beam sweeping process. As an illustrative example, for each downtilt angle of the plurality of downtilt angles, only the first half of the STT symbol pair is transmitted, then once all of the downtilt angles have been signaled (from top to bottom, for example), then the downtilt angles are signaled from bottom to top using the second half of the STT symbol pairs. A time difference $T_{AoD}$ is determined between two identical signal peaks (e.g., an identical signal peak pair with maximum magnitude), the angle of departure may be determined as follows:

$$\text{downtilt angle index} = L - \left\lfloor \frac{T_{AoD}}{2} \Big/ T_0 \right\rfloor,$$

and horizontal angle of departure=Remainder($T_{AoD}, 2T_0$), where $\lfloor \cdot \rfloor$ is the floor operator, and Remainder(a,b) returns the remainder of a divided by b.

Figure 10:
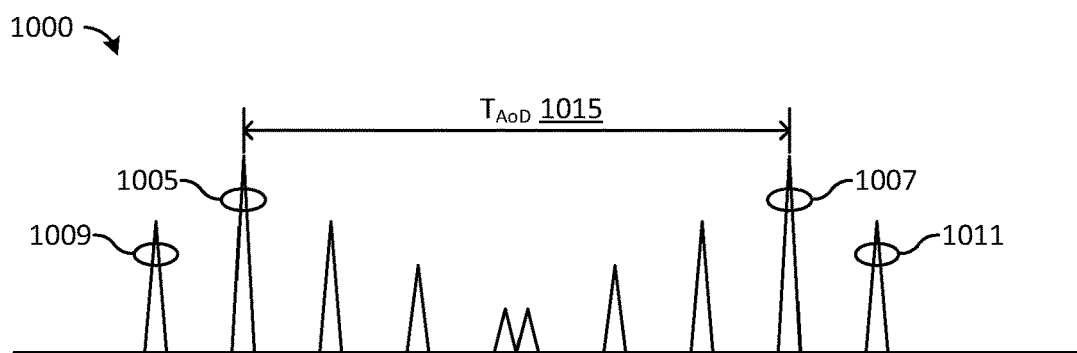
FIG. 10 illustrates a diagram of signal peaks received by a UE in a deployment with TRPs using a two dimensional antenna array, where beams utilize half of the STT symbols to help reduce beam sweeping time according to example embodiments described herein.

FIG. 10 illustrates a diagram 1000 of signal peaks received by a UE in a deployment with TRPs using a two dimensional antenna array, where beams utilize half of the STT symbols to help reduce beam sweeping time. Diagram 1000 displays a plurality of signal peaks, such as signal peaks 1005, 1007, 1009, and 1011. Signal peaks with equal magnitude correspond to a STT symbol pair. As an example, signal peaks 1005 and 1007 correspond to a STT symbol pair, as do signal peaks 1009 and 1011. Signal peaks 1005 and 1007 have maximum magnitude and likely correspond to STT symbols transmitted on a downtilt angle that is best oriented towards the UE or a downtilt angle with the lowest pathloss. The angle of departure for the UE may be determined from $T_{AoD}$ 1015, which is the time difference between signal peaks 1005 and 1007.

According to an example embodiment, hybrid beamforming, where different downtilt angles are realized in the analog domain using phase shifters, is used to support beam sweeping with two dimensional antenna arrays using STT symbols. Hybrid beamforming is a combination of both digital and analog beamforming techniques. As an example, hybrid beamforming reduces the number of transmitters by using analog phase shifters in either the intermediate frequency (IF) or radio frequency (RF) domain to form adjustable analog beams upon which digital beamforming operates.

Figure 11:
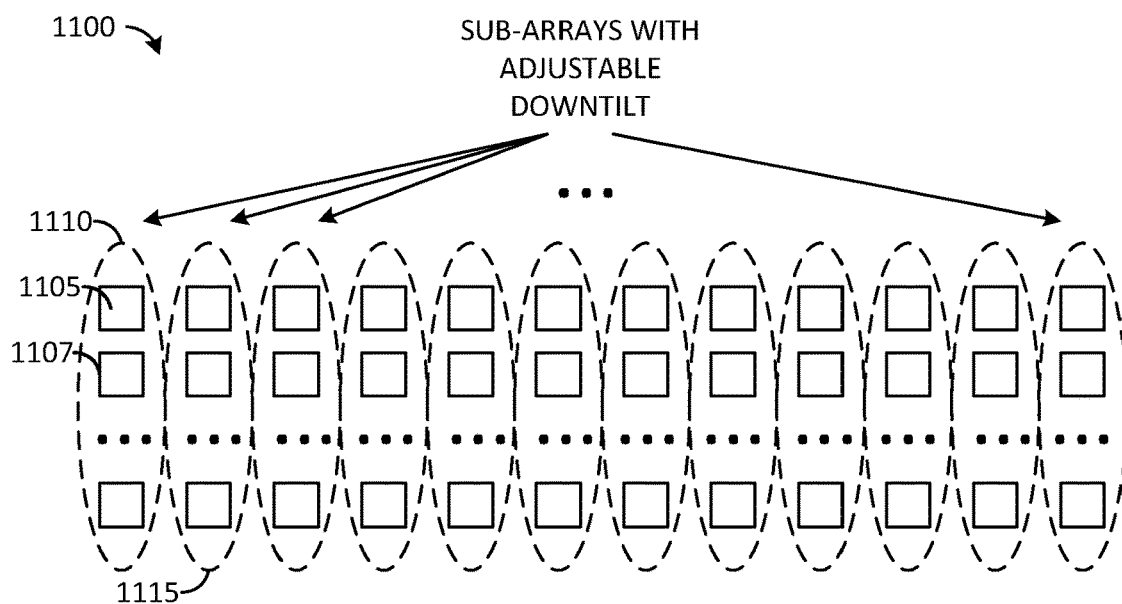
FIG. 11 illustrates a two dimensional antenna array implemented using hybrid beamforming according to example embodiments described herein.

FIG. 11 illustrates a two dimensional antenna array 1100 implemented using hybrid beamforming. Two dimensional antenna array 1100 comprises M×N antenna elements, such as antenna elements 1105 and 1107. Two dimensional antenna array 1100 is partitioned into sub-arrays, such as sub-arrays 1110 and 1115, comprising vertical columns of antenna elements. As shown in FIG. 11, there are M sub-arrays and each sub-array includes N antenna elements. Analog beamforming is performed in each of the sub-arrays to support different downtilts, while digital beamforming is performed across the sub-arrays to support the sweeping in the azimuth plane.

The angle of departure for a UE served by two dimensional antenna array 1100 may be determined as follows:

1. Configure the sub-arrays to a first downtilt angle (e.g., a lowest downtilt angle) and transmit the first half of the STI symbols to cover the azimuth plane in the first downtilt angle.

2. Repeat #1 for remaining downtilt angles in a first order (e.g., from low to high downtilt angles).

3. Configure the sub-arrays to a second downtilt angle (e.g., a highest downtilt angle) and transmit the second half of the STT symbols to cover the azimuth plane in the second downtilt angle.

4. Repeat #2 for remaining downtilt angles in a second order (e.g., from high to low downtilt angles).

As related to partitioning a large two dimensional antenna array into sub-arrays, there are many ways to partition the two dimensional antenna array into smaller sub-arrays. A first technique involves partitioning the two dimensional antenna array into vertical sub-arrays, as shown in FIG. 11. A second technique involves partitioning the two dimensional antenna array into equal sized sub-arrays. In an arbitrary antenna array of size M columns, the first half of a STT symbol may be expressed as $$x_k(t) = e^{-i(\omega_0 + k \cdot \Delta\omega)\left(t - \frac{T_0}{2}\right)} \Delta\omega \cdot T_0 = 2\pi.$$

If the antenna array is partitioned into P sub-arrays with each sub-array having M/P columns, each sub-array may form M/P azimuth beams with L different downtilts utilizing hybrid beamforming as described previously. The STT symbol for the P digital transmitters may be expressed as $$x_k(t) = e^{-i\left(\omega_0 + k \cdot \frac{M}{P} \cdot \Delta\omega\right)\left(t - \frac{T_0}{2}\right)} \Delta\omega \cdot T_0 = 2\pi.$$

At the same time, analog beamforming allows for the switching between M/P azimuth beams with a duration of $T_0 \cdot P/M$ for each azimuth beam.

FIG. 12 illustrates a two dimensional antenna array 1200 partitioned into P=4 sub-arrays. Two dimensional antenna array 1200 includes 64 antenna elements and is partitioned into four sub-arrays, such as sub-array 1205 with 16 antenna element each.

Consider a first example communications system with an antenna array with 1024 antenna elements with 8 microseconds (μs) available for transmitting STT symbols in each radio frame with a frame duration $T_F$=1 milliseconds (ms). Then the STT subcarrier spacing $$\Delta f = \frac{1}{4\mu s} = 250 \text{ kHz},$$

and the number of TRP identity offsets $T_{CID}$ when the offset granularity is 8 s is equal to $T_F/2/8$ μs=62 and if the offset granularity is 4 μs, then the number of TRP identify offsets $T_{CID}$ is equal to $T_F/2/4$ μs=125. An additional time difference, $T_{dither}$, which is added between successive frames (e.g., Time between frames=$T_F$+$T_{dither}$), may be used to encode limited radio frame number information for synchronization purposes. As an example, $T_{dither}$ ranges from 0 to 20 μs in 1 μs steps and changes between different frames.

Consider a second example communications system with an antenna array with 1024 antenna elements with an 8 μs STT symbol time (time between signal peaks) and 8 STT symbols transmitted per radio frame. If each radio frame has a frame duration $T_F$=1 ms, then communications overhead is 8*8/1000=6.5%. The STT subcarrier spacing is $$\Delta f = \frac{1}{4\mu s} = 250 \text{ kHz}.$$

The total number of bits of information that may be encoded by the STT symbols per radio frame when 1 phase modulation per STT symbol and 8PSK is used is 3*8=24 bits and when 1 phase modulation per half STT symbol and 8PSK is used, the number of bits of information that may be encoded is 3*16=48 bits.

Consider an example communications system with an antenna array that has 128 columns and supports 8 different downtilt angles. The horizontal rows of the antenna array are driven individually with a fully digital transmitter, while the different downtilt angles are realized with phase shifters. The antenna array has at least 128×8 antenna elements (more antenna elements may be used in the vertical columns to provide narrower beams, but at least 8 antenna elements are needed per vertical column). The signals transmitted out of the 128 transmitters during the 8 μs STT symbol time are expressible as $$x_k(t) = e^{-i(\omega_0 + 2\pi \cdot 8k \cdot \Delta f)\left(t - \frac{T_0}{2}\right)} \quad t = 0 \sim T_0$$

and $$x_k(t) = e^{-i(\omega_0 + 2\pi \cdot 8(127-k) \cdot \Delta f)\left(t - \frac{T_0}{2}\right)} \quad t = T_0 \sim 2T_0,$$

where Δf=250 kHz, $T_0$=4 μs, and k=0~127. During the 8 μs STT symbol time, the antenna array will cycle through downtilt beam indices 1, 2, 3, 4, 5, 6, 7, 8, 8, 7, 6, 5, 4, 3, 2, 1 in 0.5 μs steps. The total signal bandwidth is 1024*Δf=256 MHz. FIG. 13A illustrates an antenna array 1300 with 128×8 antenna elements arranged into 128 columns of 8 antenna elements each, such as column 1305. FIG. 13B illustrates downtilt beams 1350. Downtilt beams 1350 include 8 downtilt beams, such as downtilt beam 1355.

Consider an example communications system with an antenna array that has 32 columns and supports 4 different downtilt angles. The horizontal rows of the antenna array are driven individually with a fully digital transmitter, while the different downtilt angles are realized with phase shifters. The antenna array has at least 32×4 antenna elements (more antenna elements may be used in the vertical columns to provide narrower beams, but at least 4 antenna elements are needed per vertical column). The signals transmitted out of the 32 transmitters during the 8 μs STT symbol time are expressible as $$x_k(t) = e^{-i(\omega_0 + 2\pi \cdot 4k \cdot \Delta f)\left(t - \frac{T_0}{2}\right)} \quad t = 0 \sim T_0$$

and $$x_k(t) = e^{-i(\omega_0 + 2\pi \cdot 4(31-k) \cdot \Delta f)\left(t - \frac{T_0}{2}\right)} \quad t = T_0 \sim 2T_0,$$

where $\Delta f = 250$ kHz, $T_0 = 4$ μs, and $k = 0 \sim 31$. During the 8 μs STI symbol time, the antenna array will cycle through downtilt beam indices 1, 2, 3, 4, 4, 3, 2, 1 in 0.5 μs steps. The total signal bandwidth is $128 * \Delta f = 32$ MHz. FIG. 14A illustrates an antenna array 1400 with 32×4 antenna elements arranged into 32 columns of 4 antenna elements each, such as column 1405. FIG. 14B illustrates downtilt beams 1450. Downtilt beams 1450 include 4 downtilt beams, such as downtilt beam 1455.

Consider an example communications system with an antenna array that has 8 columns and supports 2 different downtilt angles. The horizontal rows of the antenna array are driven individually with a fully digital transmitter, while the different downtilt angles are realized with phase shifters. The antenna array has at least 8×2 antenna elements (more antenna elements may be used in the vertical columns to provide narrower beams, but at least 2 antenna elements are needed per vertical column). The signals transmitted out of the 8 transmitters during the 8 μs STT symbol time are expressible as $$x_k(t) = e^{-i(\omega_0 + 2\pi \cdot 2k \cdot \Delta f)\left(t - \frac{T_0}{2}\right)} \quad t = 0 \sim T_0$$

and $$x_k(t) = e^{-i(\omega_0 + 2\pi \cdot 4(7-k) \cdot \Delta f)\left(t - \frac{T_0}{2}\right)} \quad t = T_0 \sim 2T_0,$$

where $\Delta f = 250$ kHz, $T_0 = 4$ μs, and $k = 0 \sim 7$. During the 8 μs STI symbol time, the antenna array will cycle through downtilt beam indices 1, 2, 2, 1 in 0.5 μs steps. The total signal bandwidth is $16 * \Delta f = 4$ MHz. FIG. 15A illustrates an antenna array 1500 with 8×2 antenna elements arranged into 8 columns of 2 antenna elements each, such as column 1505. FIG. 15B illustrates downtilt beams 1550. Downtilt beams 1550 include 2 downtilt beams, such as downtilt beam 1555.

It is noted that the example communications systems illustrated herein are adaptable to configurations wherein hybrid beamforming is performed in the horizontal dimension, as illustrated previously.

Figures 16, 17:
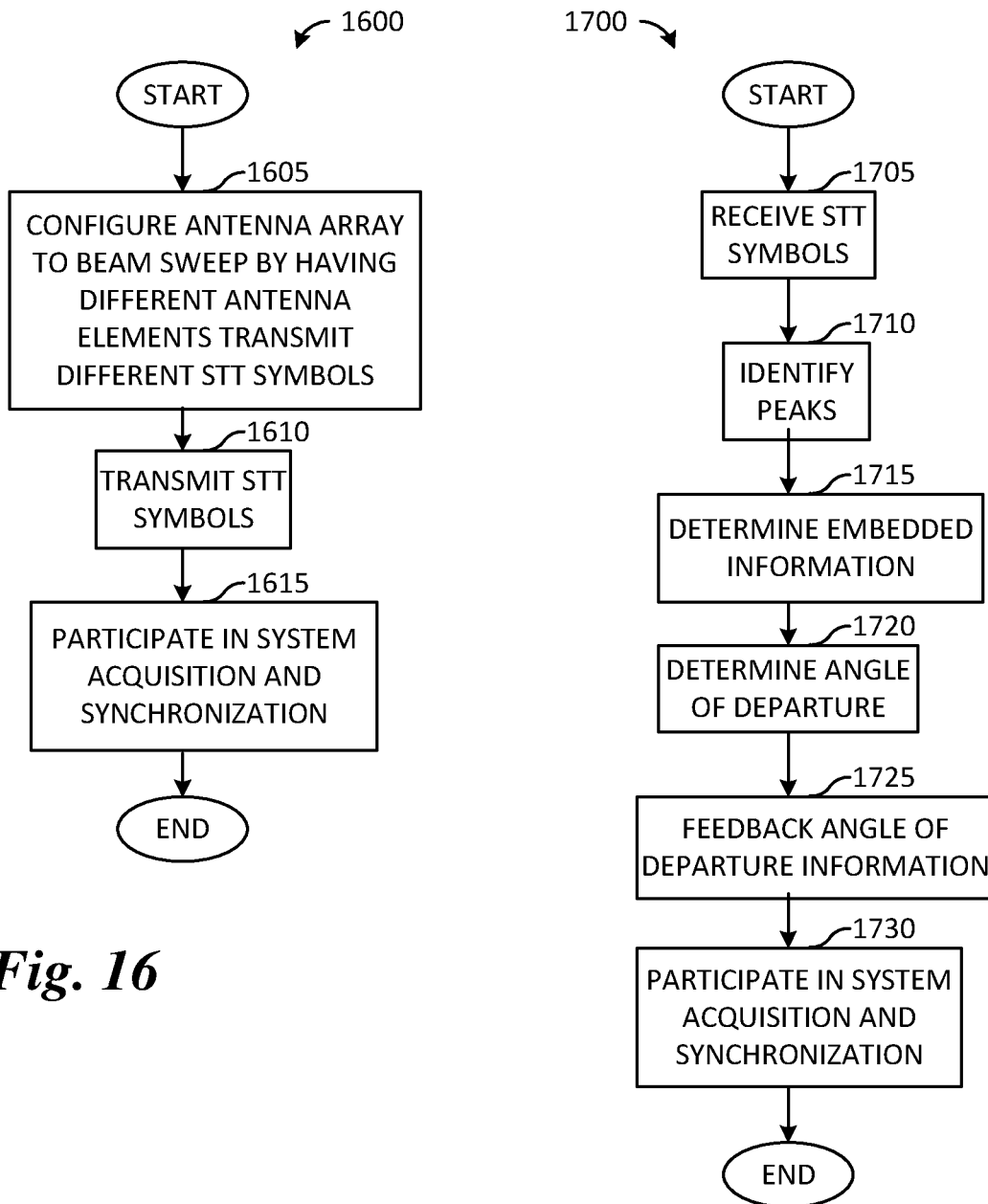
FIG. 16 illustrates a flow diagram of example operations occurring in a TRP participating in system acquisition utilizing STT symbols according to example embodiments described herein.
FIG. 17 illustrates a flow diagram of example operations occurring in a UE participating in system acquisition utilizing STT symbols according to example embodiments described herein.

FIG. 16 illustrates a flow diagram of example operations 1600 occurring in a TRP participating in system acquisition utilizing STT symbols. Operations 1600 may be indicative of operations occurring in a TRP as the TRP participates in system acquisition utilizing STT symbols to help improve efficiency involved in system acquisition.

Operations 1600 begin with the TRP generating STT symbols for the antenna elements of an antenna array (block 1605). The STT symbols may have different frequencies in different portions of each STT symbol to facilitate the determination of timing information without having to determine an absolute arrival time using a timing reference. The STT symbols may have embedded TRP information, such as TRP identifiers, in the STT symbols. The embedding of the TRP information may involve using a different TRP identifier offset for each TRP or modulating the STT symbols (using PSK, for example). The antenna array may be a one dimensional array or a two dimensional array, which may be viewed as a plurality of one dimensional arrays or a plurality of smaller two dimensional arrays. Digital beamforming or hybrid beamforming may be used to implement beams in a first dimension while the STT symbols implement beams in a second dimension. The TRP transmits the STT symbols using the antenna array to perform beam sweeping in the time domain (block 1610). A detailed discussion of how the design of the STT symbols simplifies detection at the UE is provided below. The STT symbols may be transmitted in a small portion of a data frame, which helps to keep communications overhead low. The TRP participates in system acquisition and synchronization (block 1615).

The design of the STT symbols simplify signal peak detection at the UE for a variety of reasons, including:

Each transmitter of the TRP transmits a single tone at the peak power of the transmitter (i.e., 0 dB peak to average power ratio (PAPR)). Hence, the level of the signal peaks received at the UEs is at the highest level possible.

Even in a 0 dB signal to noise ratio (SNR) situation, where the average received signal power level is the same as the noise of the UE (with an assumption that the PAR of the regularly transmitted signal is 9 dB), the signal peaks of the STT symbols will be 9 dB above the average noise level. Given that Gaussian noise has a similar PAPR, therefore, there is a $10^{-4}$ probability that the noise will have peaks at 9~10 dB above the average power as well, but the probability that the noise will interfere with the signal peaks is small and the regular structure of the signal peaks will allow for easy differentiation from noise peaks.

The design of the STT symbols allow for simple detection and rejection of interference from STT symbols transmitted by other TRPs.

In situations where the received signal level is low (e.g., at UEs located at or near the edge of the coverage area of a TRP), the received signals may be accumulated over multiple radio frames to improve the quality of the received signal at the expense of increased latency. However, for UEs with better SNR, reliable detection can be achieved quickly, speeding up the system acquisition and synchronization process.

FIG. 17 illustrates a flow diagram of example operations 1700 occurring in a UE participating in system acquisition utilizing STT symbols. Operations 1700 may be indicative of operations occurring in a UE as the UE participates in system acquisition utilizing STT symbols transmitted by a TRP using an antenna array.

Operations 1700 begin with the UE receiving STT symbols transmitted by the TRP (block 1705). The UE identifies signal peaks (block 1710). A detailed discussion of an example technique for signal peak identification or detection is provided below. The UE determines information embedded in the STT symbols (block 1715). The information may be embedded in the STT symbols, using TRP identifier offsets or modulation, for example. The UE determines an angle of departure from the signal peaks (block 1720). The angle of departure for the UE may be determined from a timing difference between signal peaks associated with a single TRP. The UE feedback information regarding the angle of departure (block 1725). The UE participates in system acquisition and synchronization using the angle of departure (block 1730).

As discussed previously, the UE may also use receive beamforming to improve communications performance. Therefore, the UE has to properly orient a receive beam towards a TRP to maximize receive signal strength. An example technique for signal peak identification involves the UE scanning with broad receive beams by switching among a plurality of fixed received beams through a search space that encompass the entirety of the UE, i.e., all 360 degrees. In an alternative embodiment, if the UE has some location information that provides a rough estimate of the location of the TRP(s), the UE can reduce the search space in accordance with the location information. In such a situation, the UE can reduce the number of broad receive beams that it has to scan through and reduce the scanning latency. The dwell time of each broad beam has to be sufficiently long for a UE located at the edge of a cell to enable reliable detection through signal integration, the dwell time may be determined by the range of the cell. Once the UE has detected the STT symbols transmitted by the TRP(s), the UE can switch to a scan with fine receive beams to refine the search and potentially further improve the detection of the signal peaks. As an example, the UE may scan within one or more broad receive beams with which it has detected the STT symbols with narrow receive beams that span the one or more broad receive beams.

It is noted that the bandwidth occupied by the STT symbols scale with the size of the antenna array. In the situation where a small antenna array is used, a question arises regarding how to obtain channel estimates for the entirety of the available bandwidth when the STT symbols only occupy a small fraction of the available bandwidth. According to an example embodiment, the STT symbols are transmitted in different center frequencies for different radio frames. A sequence of frequencies used to transmit the STT symbols, referred to as a frequency hopping pattern, may be used to further encode information about the communications system, such as the radio frame number. As an illustrative example, a first frequency hopping pattern is used to indicate a first radio frame number, a second frequency hopping pattern is used to indicate a second radio frame number, and so on. Additionally, a systematic hopping method may be developed so that different sized antenna arrays may be accommodated.

A situation may arise when an antenna array used in a communications system is larger than a maximum antenna array size supported or the available bandwidth dedicated to the transmission of STT symbols is smaller than the total number of STT symbols needed. In both situations, the antenna array may be partitioned into smaller sub-arrays that are less than or equal to the maximum antenna array size supported. Each sub-array meets the maximum array size limitation and the STT symbols of each sub-array occupies a bandwidth that is no greater than the available bandwidth dedicated to the transmission of the STT symbols. The sub-arrays may overlap. The STT symbols may hop among different sub-arrays between radio frames. Once the UE determines the hopping pattern, through control channel information, for example, the UE can combine the received signals together to determine an angle of departure for the UE for the entire antenna array.

As related to random access, once a UE is turned on or enters a new coverage area, the UE may begin to monitor the frequency and/or carrier for STT symbols transmitted by TRPs. The UE identifies the strongest TRP(s), e.g., based on the magnitudes of the signal peaks, and proceeds to acquire system information (e.g., frequency and timing synchronization information). The UE may also identify alternate TRPs with received signal levels that meet a threshold. Once the UE acquires system information, the UE is ready to initiate random access. The UE has the following information:

TRP ID from identifier time offset ($T_{CID}$) or encoded STT symbols for the strongest TRP(s).
System timing information in terms of frame number (initially for only a short sequence).
The angle of departure for a target TRP ($T_{AoD}$).
A best receive beam to use to receive transmissions from the target TRP. Correspondingly, the UE also will have a best transmit beam to use to transmit to the target TRP.

A random access technique may be designed using the above information to uniquely determine one or more time instances (time instances that correspond to when the target TRP has receive beams oriented towards the UE and is expecting to receive random access signals) to transmit a random access signal to the target TRP. The random access signal may be transmitted using the best transmit beam for the target TRP at the one or more time instances. The target TRP may transmit an acknowledgement to the random access signal to the UE using a best transmit beam determined from feedback received from the UE included in the random access signal.

In a situation when a UE is in an active session, the UE may continue to monitor the STT symbols transmitted by the TRPs and continue to provide feedback related to an angle of departure for a target TRP. The continued monitoring and feedback enables the TRPs and the UE to continue to use the best communications beam for communications. In a situation when a UE is in an idle mode, the UE may continue to monitor the STT symbols transmitted by the TRPs and determine an angle of departure for a target TRP. If the angle of departure for the target TRP has changed beyond a specified threshold, the UE updates the TRP with which it has a connection. The update may lead to a change in TRPs.

In general, paging is efficient in a low band macro network. In a situation when the UE is dormant, attempting to reach the UE and transmit a page may be inefficient. However, if the UE is idle and registered with an mmWave network, the network knows which TRP the UE was communicating with when it provided the most recent update. The paging process may proceed through a set of beams (transmit and receive beams) determined during the most recent update.

Figure 18:
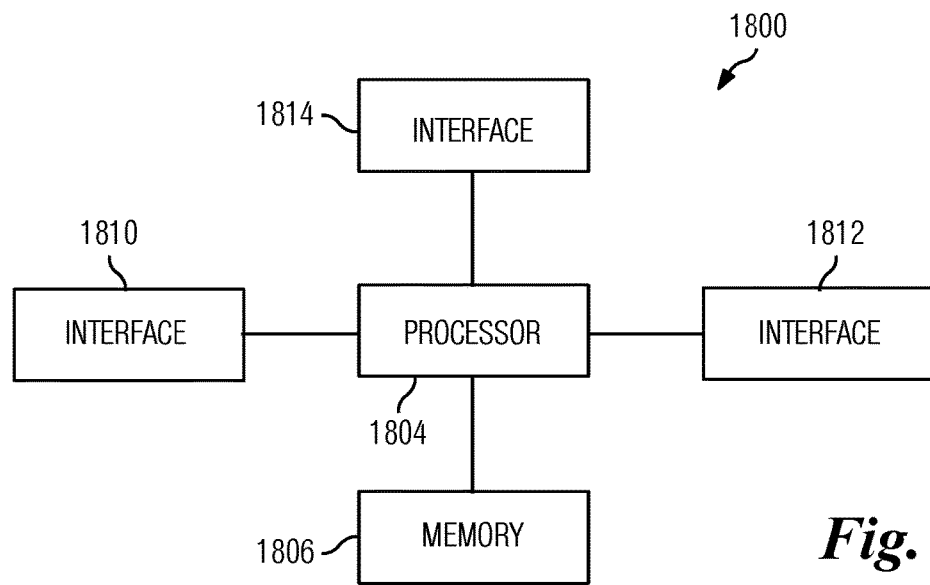
FIG. 18 illustrates a block diagram of an embodiment processing system for performing methods described herein.

FIG. 18 illustrates a block diagram of an embodiment processing system 1800 for performing methods described herein, which may be installed in a host device. As shown, the processing system 1800 includes a processor 1804, a memory 1806, and interfaces 1810-1814, which may (or may not) be arranged as shown in FIG. 18. The processor 1804 may be any component or collection of components adapted to perform computations and/or other processing related tasks, and the memory 1806 may be any component or collection of components adapted to store programming and/or instructions for execution by the processor 1804. In an embodiment, the memory 1806 includes a non-transitory computer readable medium. The interfaces 1810, 1812, 1814 may be any component or collection of components that allow the processing system 1800 to communicate with other devices/components and/or a user. For example, one or more of the interfaces 1810, 1812, 1814 may be adapted to communicate data, control, or management messages from the processor 1804 to applications installed on the host device and/or a remote device. As another example, one or more of the interfaces 1810, 1812, 1814 may be adapted to allow a user or user device (e.g., personal computer (PC), etc.) to interact/communicate with the processing system 1800. The processing system 1800 may include additional components not depicted in FIG. 18, such as long term storage (e.g., non-volatile memory, etc.).

In some embodiments, the processing system 1800 is included in a network device that is accessing, or part otherwise of, a telecommunications network. In one example, the processing system 1800 is in a network-side device in a wireless or wireline telecommunications network, such as a base station, a relay station, a scheduler, a controller, a gateway, a router, an applications server, or any other device in the telecommunications network. In other embodiments, the processing system 1800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 19:
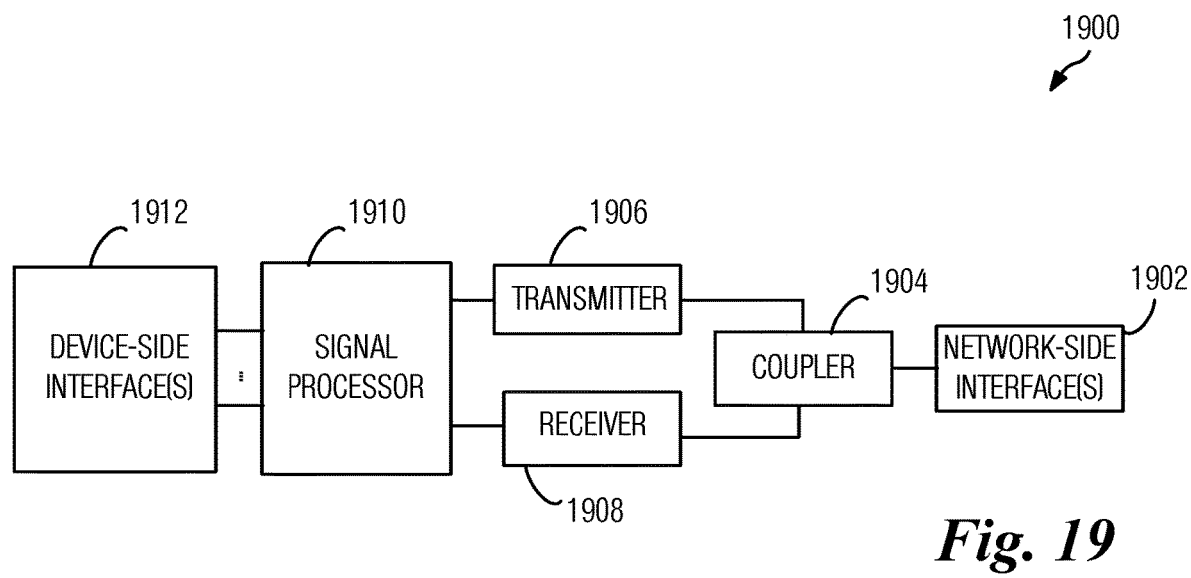
FIG. 19 illustrates a block diagram of a transceiver adapted to transmit and receive signaling over a telecommunications network according to example embodiments described herein.

In some embodiments, one or more of the interfaces 1810, 1812, 1814 connects the processing system 1800 to a transceiver adapted to transmit and receive signaling over the telecommunications network. FIG. 19 illustrates a block diagram of a transceiver 1900 adapted to transmit and receive signaling over a telecommunications network. The transceiver 1900 may be installed in a host device. As shown, the transceiver 1900 comprises a network-side interface 1902, a coupler 1904, a transmitter 1906, a receiver 1908, a signal processor 1910, and a device-side interface 1912. The network-side interface 1902 may include any component or collection of components adapted to transmit or receive signaling over a wireless or wireline telecommunications network. The coupler 1904 may include any component or collection of components adapted to facilitate bi-directional communication over the network-side interface 1902. The transmitter 1906 may include any component or collection of components (e.g., up-converter, power amplifier, etc.) adapted to convert a baseband signal into a modulated carrier signal suitable for transmission over the network-side interface 1902. The receiver 1908 may include any component or collection of components (e.g., down-converter, low noise amplifier, etc.) adapted to convert a carrier signal received over the network-side interface 1902 into a baseband signal. The signal processor 1910 may include any component or collection of components adapted to convert a baseband signal into a data signal suitable for communication over the device-side interface(s) 1912, or vice-versa. The device-side interface(s) 1912 may include any component or collection of components adapted to communicate data-signals between the signal processor 1910 and components within the host device (e.g., the processing system 1800, local area network (LAN) ports, etc.).

The transceiver 1900 may transmit and receive signaling over any type of communications medium. In some embodiments, the transceiver 1900 transmits and receives signaling over a wireless medium. For example, the transceiver 1900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1902 comprises one or more antenna/radiating elements. For example, the network-side interface 1902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Additional aspects of the various embodiments are specified below in the following clauses:

Clause 1. A method for operating a transmit-receive point (TRP), the method comprising:

generating, by the TRP, a different spatial domain to time domain transform (STT) symbol for each antenna element in an antenna array; and transmitting, by the TRP, the STT symbols using the antenna array to sweep a beam along a first plane in the time domain.

Clause 2. The method of clause 1, wherein a STT symbol generated for a k-th antenna element is expressible as:

$$x_k(t) = e^{-i(\omega_0 + k \cdot \Delta\omega)\left(t - \frac{T_0}{2}\right)} \Delta\omega \cdot T_0 = 2\pi,$$

where $\omega_0$ is a carrier frequency, $\Delta\omega$ is a sub-carrier spacing, K is a number of antenna elements in the antenna array, $T_0$ is a duration of the STT symbol, and $K\Delta\omega$ is a total used bandwidth.

Clause 3. The method of any one of clauses 1-2, wherein a STT symbol generated for a k-th antenna element is expressible as:

$$x_k(t) = e^{-i(\omega_0 + k \cdot \Delta\omega)\left(t - \frac{T_0}{2}\right)} \Delta\omega \cdot T_0 = 2\pi\text{) for } t = 0 \sim T_0$$

and $$x_k(t) = e^{-i(\omega_0 + (K-k-1)\Delta\omega)\left(t - \frac{T_0}{2}\right)} \Delta\omega \cdot T_0 = 2\pi \text{ for } t = T_0 \sim 2T_0,$$

where $\omega_0$ is a carrier frequency, $\Delta\omega$ is a sub-carrier spacing, K is a number of antenna elements in the antenna array, $T_0$ is half of a duration of the STT symbol, and $K\Delta\omega$ is a total used bandwidth.

Clause 4. The method of any one of clauses 1-3, further comprising:

embedding, by the TRP, information in the STT symbols prior to transmitting the STT symbols.

Clause 5. The method of any one of clauses 1-4, wherein embedding the STT symbols comprises:

duplicating the STT symbols; and inserting a time offset value, determined in accordance with the information, between the STT symbols and the duplicated STT symbols.

Clause 6. The method of any one of clauses 1-5, wherein embedding the STT symbols comprises:

modulating the STT symbols in accordance with the information.

Clause 7. The method of any one of clauses 1-6, wherein the STT symbols are modulated using phase modulation.

Clause 8. The method of any one of clauses 1-7, wherein the antenna array is a two dimensional array, and wherein the method further comprises:

defining, by the TRP, a set of weighting vectors corresponding to a set of angles of a second plane;

applying, by the TRP, a weighting vector from the set of weighting vectors to the STT symbols prior to transmitting the STT symbols; and repeating the applying and the transmitting for remaining weighting vectors in the set of weighting vectors.

Clause 9. The method of any one of clauses 1-8, wherein an l-th weighting vector is expressible as $$V_{kl} = e^{ik \cdot \Delta \phi l} \quad \Delta \phi_l = \frac{2\pi d_v \sin \varphi_l}{\lambda},$$

where k is vertical dimension index for an antenna element of the antenna array, l is an index of angles in the set of angles of the second plane, $d_v$ is an antenna element spacing in a vertical dimension, $\varphi_l$ is an angle in the set of angles of the second plane, and $\lambda$ is a wavelength of a carrier frequency.

Clause 10. The method of any one of clauses 1-9, wherein the STT symbols are transmitted within radio frames, and wherein a center frequency of the STT symbols changes in accordance with a hopping pattern between radio frames.

Clause 11. The method of any one of clauses 1-10, wherein the antenna array is a subset of a larger antenna array, and wherein the method further comprises:

repeating, by the TRP, the generating and the transmitting for remaining subsets of the larger antenna array.

Clause 12. A method for operating a user equipment (UE), the method comprising:

receiving, by the UE, signals associated with spatial domain to time domain transform (STT) symbols transmitted by a transmit-receive point (TRP);

identifying, by the UE, signal peaks in the received signals;

determining, by the UE, an angle of departure for the UE relative to the TRP in accordance with the signal peaks; and transmitting, by the UE, angle of departure information to the TRP.

Clause 13. The method of clause 12, wherein the received signals is expressible as $$y(\theta, t) = A e^{-i(\omega_0 t + \Phi_0)} \sum_{k=0}^{K-1} e^{-ik\left(\Delta\omega\left(t-\frac{T_0}{2}\right)-\frac{2\pi}{\lambda}d\sin(\theta)\right)},$$

where $\Phi_0$ is a constant phase offset, A is an amplitude of the received signals from each transmitting antenna element, $\omega_0$ is a carrier frequency, $\Delta\omega$ is a sub-carrier spacing, K is a number of antenna elements in an antenna array at the TRP, $T_0$ is half of a duration of the signals, and $K\Delta\omega$ is a total available bandwidth, and $\lambda$ is a wavelength of the carrier frequency.

Clause 14. The method of any one of clauses 12-13, further comprising:

determining, by the UE, information embedded in the received signals.

Clause 15. The method of any one of clauses 12-14, wherein the information is a time offset value between successive signal peaks.

Clause 16. The method of any one of clauses 12-15, wherein the information is modulated into the received signals.

Clause 17. The method of any one of clauses 12-16, wherein determining the angle of departure comprises:

determining a time separation between a pair of signal peaks corresponding to a line of sight path; and determining channel characteristics, including the angle of departure, for a channel between the UE and the TRP in accordance with the time separation.

Clause 18. The method of any one of clauses 12-17, wherein determining the angle of departure comprises:

identifying at least two pairs of signal peaks; and determining channel characteristics, including the angle of departure, for channels corresponding to the at least two pairs of signal peaks, the channel characteristics determined in accordance with a time separation of each pair of signal peaks of the at least two pairs of signal peaks.

Clause 19. A transmit-receive point (TRP) comprising:

a processor; and a computer readable storage medium storing programming for execution by the processor, the programming including instructions to configure the TRP to:

generate a different spatial domain to time domain transform (STT) symbol for each antenna element in an antenna array, and transmit the STT symbols using the antenna array to sweep a beam along a first plane in the time domain.

Clause 20. The TRP of clause 19, wherein the programming includes instructions to configure the TRP to embed information in the STT symbols prior to transmitting the STT symbols.

Clause 21. The TRP of any one of clauses 19-20, wherein the programming includes instructions to configure the TRP to duplicate the STT symbols, and insert a time offset value, determined in accordance with the information, between the STT symbols and the duplicated STT symbols.

Clause 22. The TRP of any one of clauses 19-21, wherein the programming includes instructions to configure the TRP to modulate the STT symbols in accordance with the information.

Clause 23. The TRP of any one of clauses 19-22, wherein the antenna array is a two dimensional array, and wherein the programming includes instructions to configure the TRP to define a set of weighting vectors corresponding to a set of angles of a second plane, apply a weighting vector from the set of weighting vectors to the STT symbols prior to transmitting the STT symbols, and repeat an applying and a transmitting for remaining weighting vectors in the set of weighting vectors.

Clause 24. A user equipment (UE) comprising:

a processor; and a computer readable storage medium storing programming for execution by the processor, the programming including instructions to configure the UE to:

receive signals associated with spatial domain to time domain transform (STT) symbols transmitted by a transmit-receive point (TRP), identify signal peaks in the received signals, determine an angle of departure for the UE relative to the TRP in accordance with the signal peaks, and transmit angle of departure information to the TRP.

Clause 25. The UE of clause 24, wherein the programming includes instructions to configure the UE to determine information embedded in the received signals.

Clause 26. The UE of any one of clauses 24-25, wherein the programming includes instructions to configure the UE to determine a time separation between a pair of signal peaks corresponding to a line of sight path, and determine channel characteristics, including the angle of departure, for a channel between the UE and the TRP in accordance with the time separation.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a generating unit/module, an embedding unit/module, a duplicating unit/module, an inserting unit/module, a modulating unit/module, a defining unit/module, an applying unit/module, an identifying unit/module, a determining unit/module, and/or a repeating unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for operating a transmit-receive point (TRP), the method comprising:
   generating, by the TRP, a different spatial domain to time domain transform (STT) symbol for each antenna element in an antenna array; and
   transmitting, by the TRP, the STT symbols using the antenna array to sweep a beam along a first plane in the time domain.

2. The method of claim 1, wherein a STT symbol generated for a k-th antenna element is expressible as:

$$x_k(t) = e^{-i(\omega_0 + k \cdot \Delta\omega)\left(t - \frac{T_0}{2}\right)} \Delta\omega \cdot T_0 = 2\pi,$$

where $\omega_0$ is a carrier frequency, $\Delta\omega$ is a sub-carrier spacing, K is a number of antenna elements in the antenna array, $T_0$ is a duration of the STT symbol, and $K\Delta\omega$ is a total used bandwidth.

3. The method of claim 1, wherein a STT symbol generated for a k-th antenna element is expressible as:

$$x_k(t) = e^{-i(\omega_0 + k \cdot \Delta\omega)\left(t - \frac{T_0}{2}\right)} \Delta\omega \cdot T_0 = 2\pi \text{ for } t = 0 \sim T_0$$

and $$x_k(t) = e^{-i(\omega_0 + (K-k-1)\Delta\omega)\left(t - \frac{T_0}{2}\right)} \Delta\omega \cdot T_0 = 2\pi \text{ for } t = T_0 \sim 2T_0,$$

where $\omega_0$ is a carrier frequency, $\Delta\omega$ is a sub-carrier spacing, K is a number of antenna elements in the antenna array, $T_0$ is half of a duration of the STT symbol, and $K\Delta\omega$ is a total used bandwidth.

4. The method of claim 1, further comprising:
   embedding, by the TRP, information in the STT symbols prior to transmitting the STT symbols.

5. The method of claim 4, wherein embedding the STT symbols comprises:
   duplicating the STT symbols; and
   inserting a time offset value, determined in accordance with the information, between the STT symbols and the duplicated STT symbols.

6. The method of claim 4, wherein embedding the STT symbols comprises:
   modulating the ST symbols in accordance with the information.

7. The method of claim 6, wherein the STT symbols are modulated using phase modulation.

8. The method of claim 1, wherein the antenna array is a two dimensional array, and wherein the method further comprises:
   defining, by the TRP, a set of weighting vectors corresponding to a set of angles of a second plane;
   applying, by the TRP, a weighting vector from the set of weighting vectors to the STI symbols prior to transmitting the STT symbols; and
   repeating the applying and the transmitting for remaining weighting vectors in the set of weighting vectors.

9. The method of claim 8, wherein an l-th weighting vector is expressible as $$V_{kl} = e^{ik \cdot \Delta\phi l} \quad \Delta\phi_l = \frac{2\pi d_v \sin\varphi_l}{\lambda},$$

where k is vertical dimension index for an antenna element of the antenna array, l is an index of angles in the set of angles of the second plane, $d_v$ is an antenna element spacing in a vertical dimension, $\varphi_l$ is an angle in the set of angles of the second plane, and $\lambda$ is a wavelength of a carrier frequency.

10. The method of claim 1, wherein the STT symbols are transmitted within radio frames, and wherein a center frequency of the STT symbols changes in accordance with a hopping pattern between radio frames.

11. The method of claim 1, wherein the antenna array is a subset of a larger antenna array, and wherein the method further comprises:
   repeating, by the TRP, the generating and the transmitting for remaining subsets of the larger antenna array.

12. A method for operating a user equipment (UE), the method comprising:
   receiving, by the UE, signals associated with spatial domain to time domain transform (STI) symbols transmitted by a transmit-receive point (TRP);
   identifying, by the UE, signal peaks in the received signals;
   determining, by the UE, an angle of departure for the UE relative to the TRP in accordance with the signal peaks; and
   transmitting, by the UE, angle of departure information to the TRP.

13. The method of claim 12, wherein the received signals is expressible as $$y(\theta, t) = A e^{-i(\omega_0 t + \Phi_0)} \sum_{k=0}^{K-1} e^{-ik\left(\Delta\omega\left(t - \frac{T_0}{2}\right) - \frac{2\pi}{\lambda} d \sin(\theta)\right)},$$

where $\Phi_0$ is a constant phase offset, A is an amplitude of the received signals from each transmitting antenna element, $\omega_0$ is a carrier frequency, $\Delta\omega$ is a sub-carrier spacing, K is a number of antenna elements in an antenna array at the TRP, $T_0$ is half of a duration of the signals, and $K\Delta\omega$ is a total available bandwidth, and $\lambda$ is a wavelength of the carrier frequency.

14. The method of claim 12, further comprising:
determining, by the UE, information embedded in the received signals.

15. The method of claim 14, wherein the information is a time offset value between successive signal peaks.

16. The method of claim 14, wherein the information is modulated into the received signals.

17. The method of claim 12, wherein determining the angle of departure comprises:
determining a time separation between a pair of signal peaks corresponding to a line of sight path; and
determining channel characteristics, including the angle of departure, for a channel between the UE and the TRP in accordance with the time separation.

18. The method of claim 12, wherein determining the angle of departure comprises:
identifying at least two pairs of signal peaks; and
determining channel characteristics, including the angle of departure, for channels corresponding to the at least two pairs of signal peaks, the channel characteristics determined in accordance with a time separation of each pair of signal peaks of the at least two pairs of signal peaks.

19. A transmit-receive point (TRP) comprising:
a processor; and
a computer readable storage medium storing programming for execution by the processor, the programming including instructions to configure the TRP to:
generate a different spatial domain to time domain transform (STT) symbol for each antenna element in an antenna array, and
transmit the STT symbols using the antenna array to sweep a beam along a first plane in the time domain.

20. The TRP of claim 19, wherein the programming includes instructions to configure the TRP to embed information in the STT symbols prior to transmitting the STT symbols.

21. The TRP of claim 20, wherein the programming includes instructions to configure the TRP to duplicate the STT symbols, and insert a time offset value, determined in accordance with the information, between the STT symbols and the duplicated STT symbols.

22. The TRP of claim 20, wherein the programming includes instructions to configure the TRP to modulate the STT symbols in accordance with the information.

23. The TRP of claim 19, wherein the antenna array is a two dimensional array, and wherein the programming includes instructions to configure the TRP to define a set of weighting vectors corresponding to a set of angles of a second plane, apply a weighting vector from the set of weighting vectors to the STT symbols prior to transmitting the STT symbols, and repeat an applying and a transmitting for remaining weighting vectors in the set of weighting vectors.

24. A user equipment (UE) comprising:
a processor; and
a computer readable storage medium storing programming for execution by the processor, the programming including instructions to configure the UE to:
receive signals associated with spatial domain to time domain transform (STT) symbols transmitted by a transmit-receive point (TRP),
identify signal peaks in the received signals,
determine an angle of departure for the UE relative to the TRP in accordance with the signal peaks, and
transmit angle of departure information to the TRP.

25. The UE of claim 24, wherein the programming includes instructions to configure the UE to determine information embedded in the received signals.

26. The UE of claim 24, wherein the programming includes instructions to configure the UE to determine a time separation between a pair of signal peaks corresponding to a line of sight path, and determine channel characteristics, including the angle of departure, for a channel between the UE and the TRP in accordance with the time separation.

* * * * *

UNITED STATES PATENT AND TRADEMARK OFFICE
CERTIFICATE OF CORRECTION

PATENT NO. : 10,509,093 B2  
APPLICATION NO. : 15/395649  
DATED : December 17, 2019  
INVENTOR(S) : Zhengxiang Ma Page 1 of 1

It is certified that error appears in the above-identified patent and that said Letters Patent is hereby corrected as shown below:

In the Claims

In Column 24, Line 7, Claim 6, delete "the ST symbols" and insert --the STT symbols--.

In Column 24, Line 17, Claim 8, delete "the STI symbols" and insert --the STT symbols--.

Signed and Sealed this  
Fifth Day of May, 2020

Andrei Iancu  
*Director of the United States Patent and Trademark Office*